US008605195B2

(12) United States Patent
Tanaka et al.

(10) Patent No.: US 8,605,195 B2

(45) Date of Patent: Dec. 10, 2013

(54) IMAGE-TAKING LENS SYSTEM, IMAGE-TAKING DEVICE PROVIDED WITH AN IMAGE-TAKING LENS SYSTEM, AND PORTABLE TERMINAL PROVIDED WITH AN IMAGE-TAKING DEVICE

(75) Inventors: Hiroaki Tanaka, Sakai (JP); Keiji Matsusaka, Osaka (JP); Eigo Sano, Hino (JP)

(73) Assignee: Konica Minolta Opto, Inc., Tokyo (JP)

(*) Notice: Subject to any disclaimer, the term of this patent is extended or adjusted under 35 U.S.C. 154(b) by 183 days.

(21) Appl. No.: 13/376,297

(22) PCT Filed: May 26, 2010

(86) PCT No.: PCT/JP2010/058887

§ 371 (c)(1), (2), (4) Date: Dec. 5, 2011

(87) PCT Pub. No.: WO2010/140515

PCT Pub. Date: Dec. 9, 2010

(65) Prior Publication Data

US 2012/0081596 A1 Apr. 5, 2012

(30) Foreign Application Priority Data

Jun. 3, 2009 (JP) ................................ 2009-133702

(51) Int. Cl.

*H04N 5/225* (2006.01)
*G02B 13/18* (2006.01)
*G02B 9/34* (2006.01)

(52) U.S. Cl.

USPC ........................... 348/340; 359/773; 359/715

(58) Field of Classification Search

USPC .......... 348/340, 337, 335; 359/773, 708, 715, 359/717

See application file for complete search history.

(56) References Cited

U.S. PATENT DOCUMENTS

| | | | | |
|---|---|---|---|---|
| 6,867,933 | B2 * | 3/2005 | Matsusaka | 359/783 |
| 8,189,272 | B1 * | 5/2012 | Huang et al. | 359/715 |
| 8,189,276 | B1 * | 5/2012 | Hsu et al. | 359/784 |
| 8,373,937 | B2 * | 2/2013 | Hsieh et al. | 359/717 |
| 8,411,377 | B2 * | 4/2013 | Tsai et al. | 359/780 |
| 8,482,863 | B2 * | 7/2013 | Tsai et al. | 359/714 |
| 2004/0228009 | A1 | 11/2004 | Kamo et al. | |
| 2008/0043343 | A1 * | 2/2008 | Chen et al. | 359/689 |

(Continued)

FOREIGN PATENT DOCUMENTS

| | | |
|---|---|---|
| JP | 2002-365530 | 12/2002 |
| JP | 2004-341013 | 12/2004 |

(Continued)

OTHER PUBLICATIONS

English Translation of an Office Action dated Jan. 22, 2013 issued in the corresponding Japanese Patent Application No. 2011-518408.

*Primary Examiner* — Aung S Moe

(74) *Attorney, Agent, or Firm* — Cozen O'Connor

(57) ABSTRACT

An image pickup lens comprises a first lens (L1) having a positive refractive power, an aperture stop (s3), a second lens (L2) having a negative refractive power and having a concave surface facing the image side, a third lens (L3) having a positive refractive power, and a fourth lens (L4) having a negative refractive power and having a concave surface facing the image side. The image pickup lens satisfies predetermined formulae.

10 Claims, 13 Drawing Sheets

20
50
52a 52b
52
54

(56) References Cited

U.S. PATENT DOCUMENTS

2010/0020416 A1* 1/2010 Tasi .............................. 359/715
2010/0165483 A1* 7/2010 Tang et al. .................... 359/715
2010/0165484 A1* 7/2010 Yin et al. ...................... 359/715
2010/0302652 A1* 12/2010 Ozaki ........................... 359/708
2012/0081596 A1* 4/2012 Tanaka et al. ................. 348/340
2012/0140339 A1* 6/2012 Huang et al. .................. 359/715

FOREIGN PATENT DOCUMENTS

JP 2005-292559 10/2005
JP 3146436 11/2008
JP 2009-69195 4/2009

* cited by examiner

EXAMPLE 1

EXAMPLE 2

EXAMPLE 3

EXAMPLE 4

EXAMPLE 1
F=2.8
1.00
0.75
0.50
0.25
d-LINE
g-LINE
-0.100 -0.050 0.0 0.050 0.100
SPHERICAL ABERRATION (mm)
Y=3.53mm
3.53
2.65
1.76
0.88
T
S
S
M
-0.100 -0.050 0.0 0.050 0.100
ASTIGMATISM (mm)
Y=3.53mm
3.53
2.65
1.76
0.88
-2.0 -1.0 0.0 1.0 2.0
DISTORTION (%)

EXAMPLE 2

EXAMPLE 3

EXAMPLE 4

EXAMPLE 5

IMAGE-TAKING LENS SYSTEM, IMAGE-TAKING DEVICE PROVIDED WITH AN IMAGE-TAKING LENS SYSTEM, AND PORTABLE TERMINAL PROVIDED WITH AN IMAGE-TAKING DEVICE

RELATED APPLICATIONS

This application is a U.S. National Phase Application under 35 USC 371 of International Application PCT/JP2010/058887 filed May 26, 2010.

This application claims the priority of Japanese application No. 2009-133702 filed Jun. 3, 2009, the entire content of which is hereby incorporated by reference.

TECHNICAL FIELD

The present invention relates to an image-taking lens system for directing light to an image-sensing element, an image-taking device provided with an image-taking lens system, and a portable terminal provided with an image-taking device.

BACKGROUND ART

Conventionally, compact, slim image-taking devices are incorporated in portable terminals such as cellular phones and PDAs (personal digital assistants), and this makes it possible to transfer not only audible but also visual information to and from a remote location. Image-sensing elements used in such image-taking devices include CCD (charge-coupled device)-type image sensors and CMOS (complementary metal-oxide semiconductor)-type image sensors. Today, image-sensing elements boast of increased numbers of pixels with accordingly high definition, bringing portable terminals offering high-quality images into the market. Typically, image-taking devices incorporated in portable terminals employ an image-taking lens system composed of two or three lens elements. However, while image-taking lens systems employed in image-taking devices provided with a high-definition image-sensing element are expected to offer high resolution, image-taking lens systems composed of two or three lens elements do not provide satisfactory lens performance. This has led to proposals of image-taking lens systems composed of four lens elements, which can achieve still higher performance than those composed of two or three lens elements.

As an image-taking lens system composed of four lens elements, for example, Patent Document 1 listed below discloses a so-called inverted-Ernostar type image-taking lens system composed of, from the object side, a first lens element having a positive refractive power, a second lens element having a negative refractive power, a third lens element having a positive refractive power, and a fourth lens element having a positive refractive power.

Inconveniently, however, according to the conventional technology mentioned above, owing to the inverted-Ernostar type lens construction, the fourth lens element is a positive lens element, and this, as compared with where the fourth lens element is a lens element having a negative refractive power as in a telephoto type construction, results in the image-taking lens system having a principal point closer to the image side, and hence having a longer back focal length. This makes it difficult to shorten the total length of the image-taking lens system. Moreover, of the four lens elements of which the image-taking lens system is composed, only one lens element has a negative refractive power, and this makes it difficult to correct the Petzval sum. Thus, satisfactory performance cannot be obtained in a peripheral part of the image field.

As another image-taking lens system composed of four lens elements, for example, Patent Document 2 listed below discloses a so-called telephoto type image-taking lens system composed of, from the object side, a first lens element having a positive refractive power, a second lens element having a negative refractive power, a third lens element having a positive refractive power, and a fourth lens element having a negative refractive power. This construction gives the image-taking device a shorter total length, and thus makes it compact.

Inconveniently, however, according to Patent Document 2 mentioned above, the image-taking view angle is small, and aberration correction is insufficient; moreover, with that construction, giving the image-taking lens system a shorter total length degrades the lens performance, and this makes it difficult to cope with image-sensing elements with increased number of pixels.

As yet another image-taking lens system composed of four lens elements, for example, Patent Document 3 listed below discloses a so-called telephoto type image-taking lens system composed of, from the object side, a first lens element having a positive refractive power, a second lens element having a negative refractive power, a third lens element having a positive refractive power, and a fourth lens element having a negative refractive power and having a meniscus shape with a concave surface facing the image side.

Typically, between the fourth lens element, which is the most image-side lens element, and the image-sensing element, there is disposed a parallel-plane plate such as an optical low-pass filter, an infrared cut filter, and the seal glass serving as the package of the image-sensing element. Inconveniently, however, according to Patent Document 3 mentioned above, a peripheral part of the fourth lens element with respect to the optical axis considerably protrudes toward the image plane side. Thus, preventing the fourth lens element from interfering with the parallel-plane plate such as the optical low-pass filter requires a long back focal length. A long back focal length spoils the advantage of a telephoto type construction, making it difficult to shorten the total length of the image-taking lens system. Moreover, according to the conventional technology mentioned above, aberration correction is insufficient to cope with image-sensing elements with increased numbers of pixels.

LIST OF CITATIONS

Patent Literature

Patent Document 1: JP-A-2004-341013, paragraphs 0137 and 0138, FIG. 1

Patent Document 2: JP-A-2002-365530, paragraphs 0009 and 0010, FIG. 1

Patent Document 3: JP-A-2005-292559, paragraphs 0025 and 0026, FIG. 1

SUMMARY OF INVENTION

Technical Problem

The present invention has been devised to overcome the inconveniences discussed above, and an object of the invention is to provide an image-taking lens system that, despite being composed of four lens elements, is compact and has satisfactorily corrected aberrations, to provide an image-taking device provided with such an image-taking lens system, and to provide a portable terminal provided with such an image-taking device.

Solution to Problem

To achieve the above object, according to the invention, an image-taking lens system for imaging light from a subject on an image-sensing element is provided with, from the object side: a first lens element having a positive refractive power; an aperture stop; a second lens element having a negative refractive power and having a concave surface facing the image side; a third lens element having a positive refractive power; and a fourth lens element having a negative refractive power and having a concave surface facing the image side. Here, the following formulae are fulfilled:

$$0.45<f3/f<0.95 \quad (1)$$

$$0.75<SIL/TL<0.95 \quad (2)$$

$$0.3<r1/f<0.45 \quad (3)$$

where f3 represents the focal length of the third lens element; f represents the focal length of the entire image-taking lens system; SIL represents the distance from the aperture stop plane to the image plane along the optical axis; TL represents the distance from the most object-side lens surface of the image-taking lens system to the image plane along the optical axis; and r1 represents the radius of curvature of the object-side lens surface of the first lens element L1.

With this construction, by giving the first to third lens elements a positive composite refractive power and the fourth lens element a negative refractive power so as to constitute a so-called telephoto type lens construction, it is possible to shorten the total length of the image-taking lens system.

Moreover, with this construction, by providing two lens elements having a negative refractive power in the image-taking lens system, it is possible to increase the number of divergent surfaces, and to correct the Petzval sum. Moreover, also by forming the image-side lens surface of the second lens element into a concave surface, it is possible to correct the Petzval sum.

Moreover, by forming the image-side lens surface of the fourth lens element into a concave surface as in this construction, it is possible to shorten the axial distance from the image-side lens surface of the fourth lens element to the image plane (that is, the back focal length).

By fulfilling Formula (1), it is possible to set the focal length of the third lens element adequately, and it is thus possible to shorten the total length of the image-taking lens system and correct aberrations in a compatible manner.

By fulfilling Formula (2), it is possible to dispose the aperture stop at an adequate position between the first and second lens elements, and it is thus possible to make the light beam incident on the image plane telecentric and correct distortion and lateral chromatic aberration (transverse chromatic aberration).

By fulfilling Formula (3), it is possible to give the object-side lens element of the first lens element an adequate radius of curvature, and it is thus possible to shorten the total length of the image-taking lens system and correct aberrations in a compatible manner.

According to the invention, preferably, the second lens element fulfills the following formula:

$$15<\nu 2<31 \quad (4)$$

Here, ν2 represents the Abbe number of the second lens element L2.

By using a material with a comparatively high dispersion in the second lens element as defined by Formula (4), it is possible to correct axial chromatic aberration (longitudinal chromatic aberration). Forming the image-side lens surface of the second lens element into a highly divergent surface increases the angles of incidence of the rays in a peripheral part of the lens element, and this produces lateral chromatic aberration. By fulfilling Formula (4), however, it is possible to correct the lateral chromatic aberration.

According to the invention, preferably, the third lens element fulfills the following formula:

$$0.2<T3/f<0.34 \quad (5)$$

Here, T3 represents the thickness of the third lens element L3 along the optical axis, and f represents the focal length of the entire image-taking lens system.

By fulfilling Formula (5), it is possible to set the thickness of the third lens element adequately, and it is thus possible to shorten the total length of the image-taking lens system and correct aberrations in a compatible manner.

According to the invention, preferably, the fourth lens element fulfills the following formula:

$$0.05<T4/f<0.17 \quad (6)$$

Here, T4 represents the thickness of the fourth lens element L4 along the optical axis, and f represents the focal length of the entire image-taking lens system.

The fourth lens element is disposed close to the image plane, and its effective lens diameter is large. Its refractive power thus varies greatly between near the optical axis and in a peripheral part of the lens element, and its thickness along the optical axis greatly affects field curvature. By fulfilling Formula (6), it is possible to set the thickness of the fourth lens element along the optical axis adequately, and it is thus possible to give the image-taking lens system a satisfactory image field.

According to the invention, preferably, the fourth lens element fulfills the following formula:

$$0.3<T4/SG4<0.6 \quad (7)$$

Here, T4 represents the thickness of the fourth lens element L4 along the optical axis, and SG4 represents the thickness of the fourth lens element L4 at its thickest part.

By fulfilling Formula (7), it is possible to set the thickness of the fourth lens element L4 along the optical axis and in its thickest part in adequate ranges, and it is thus possible to give the fourth lens element an adequate refractive power in its paraxial and peripheral parts.

According to the invention, preferably, the fourth lens element is a biconcave lens element.

With this construction, both surfaces of the fourth lens element contribute to its refractive power, and this prevents a peripheral part of the image-side lens surface of the fourth lens element from greatly protruding toward the image side. Even disposing a parallel-plane plate between the fourth lens element and the image-sensing element does not lengthen the back focal length.

According to the invention, preferably, the image-side lens surface of the fourth lens element has an aspherical shape, and the aspherical surface has a negative refractive power near the optical axis, has an increasingly low negative refractive power toward a peripheral part of the lens surface, and has an inflection point in the peripheral part of the lens surface. It should be noted that an inflection point denotes, on a curve defining a sectional shape of a lens across its effective radius, wherever the tangent line to the curve perpendicularly intersects the optical axis, the intersection between the curve defining the sectional shape of the lens and the tangent line.

With this construction, the light beam incident on the image plane can easily be made telecentric. Moreover, the image-side lens surface of the third lens element no longer needs to be given an excessively low negative refractive power in a peripheral part of the lens element, and thus off-axial aberration can be corrected satisfactorily.

According to the invention, preferably, the first to fourth lens elements are formed of a resin material.

According to the invention, preferably, an image-taking device is provided with: an image-taking lens system as described above; and an image-sensing element.

According to the invention, preferably, a portable terminal is provided with an image-taking device as described above.

Advantageous Effects of the Invention

According to the invention, by giving the first to third lens elements a positive composite refractive power and the fourth lens element a negative refractive power so as to constitute a so-called telephoto type lens construction, it is possible to shorten the total length of the image-taking lens system; furthermore, by forming the image-side lens surface of the fourth lens element into a concave surface, it is possible to shorten the back focal length. Thus, despite adopting a four-lens-element construction, it is possible to make the image-taking lens system compact. Moreover, by providing two lens elements having a negative refractive power in the image-taking lens system, it is possible to increase the number of divergent surfaces, and furthermore, also by forming the image-side lens surface of the second lens element into a concave surface, it is possible to easily correct the Petzval sum. Thus, it is possible to obtain satisfactory imaging performance even in a peripheral part of the image field.

According to the invention, Formula (1) defines an adequate range for the focal length of the third lens element. Under the lower limit of Formula (1), the refractive power of the third lens element is excessively high, and thus it is difficult to correct high-order spherical aberration and coma. On the other hand, over the upper limit of Formula (1), the focal length of the third lens element is excessively long, and this makes it difficult to shorten the total length of the image-taking lens system. When Formula (1) is fulfilled the image-taking lens system is compact, and aberrations can be corrected satisfactorily.

According to the invention, Formula (2) defines an adequate position of the aperture stop between the first and second lens element. Under the lower limit of Formula (2), the aperture stop is excessively close to the image side, and thus it is difficult to make the image-side light beam telecentric. On the other hand, over the upper limit of Formula (2), the aperture stop is excessively far away from the center of the image-taking lens system, and thus it is impossible to achieve symmetry in the image-taking lens system; thus, it is difficult to correct distortion and lateral chromatic aberration. When Formula (2) is fulfilled, the image-side light beam is made telecentric, and distortion and lateral chromatic aberration can be corrected satisfactorily.

According to the invention, Formula (3) defines an adequate range for the radius of curvature of the object-side lens surface of the first lens element. Under the lower limit of Formula (3), the object-side lens surface of the first lens element has an excessively high refractive power, and thus it is difficult to correct high-order spherical aberration and coma occurring in the first lens element. On the other hand, over the higher limit of Formula (3), the object-side lens surface of the first lens element has an excessively low refractive power, and thus it is difficult to locate the composite principal point of the first and second lens elements closer to the object side; thus, the image-taking lens system has an increased total length. When Formula (3) is fulfilled, the image-taking lens system is compact, and aberrations can be corrected satisfactorily.

According to the invention, Formula (4) defines an adequate range for the Abbe number of the second lens element. Under the lower limit of Formula (4), axial chromatic aberration can be corrected satisfactorily, but the lateral chromatic aberration occurring in a peripheral part of the light beam is larger. On the other hand, over the upper limit of Formula (4), the lateral chromatic aberration occurring in a peripheral part of the light beam can be reduced, but axial chromatic aberration cannot be corrected satisfactorily. When Formula (4) is fulfilled, both axial chromatic aberration and lateral chromatic aberration can be corrected satisfactorily.

According to the invention, Formula (5) defines an adequate range for the thickness of the third lens element along the optical axis. Under the lower limit of Formula (5), the thickness of the third lens element along the optical axis is excessively small, and thus the third lens element has a long focal length; this makes it difficult to shorten the total length of the image-taking lens system. On the other hand, over the upper limit of Formula (5), the third lens element has an excessively large thickness along the optical axis, and thus the third lens element has a high refractive power; this makes it difficult to reduce high-order spherical aberration and coma. When Formula (5) is fulfilled, the image-taking lens system is compact, and aberrations can be corrected satisfactorily.

According to the invention, Formula (6) defines an adequate range for the thickness of the fourth lens element along the optical axis. Over the upper limit or under the lower limit of Formula (6), the image-taking lens system has an image field that is curved excessively to the over or under side. When Formula (6) is fulfilled, the image-taking lens system has a satisfactory image field.

According to the invention, Formula (7) defines adequate ranges for the thickness of the fourth lens element along the optical axis and at its thickest part to give the fourth lens element an adequate refractive power in its paraxial and peripheral parts. Under the lower limit of Formula (7), the difference in refractive power between the paraxial and peripheral parts is excessively large, and thus it is difficult to properly correct field curvature. On the other hand, over the lower limit of the Formula (7), the difference in refractive power between the paraxial and peripheral parts is excessively small, and thus it is difficult to make peripheral rays telecentric and to correct coma in peripheral rays.

According to the invention, since the fourth lens element is a biconcave lens element, both surfaces of the fourth lens element contribute to its refractive power, and this prevents a peripheral part of the image-side lens surface of the fourth lens element from greatly protruding toward the image side. Thus, the back focal length is not long, and the image-taking lens system is compact.

According to the invention, the image-side lens surface of the fourth lens element has an aspherical shape, and the aspherical surface has an inflection point in a peripheral part of the lens surface. This reduces the angles of incidence at which the rays in a peripheral part of the lens element are incident on the image plane, and thus makes the light beam incident on the image plane telecentric. Moreover, the image-side lens surface of the third lens element no longer needs to be given an excessively low negative refractive power in a peripheral part of the lens element, and thus off-axial aberration can be corrected satisfactorily.

According to the invention, the first to fourth lens elements are formed of a resin material. This makes it possible to fabricate the lens elements by injection molding, and thus it is possible to mass-produce even lens elements with small radii of curvature and diameters inexpensively. Moreover, resin lens elements can be molded at comparatively low temperatures, and this helps reduce wear on molding dies as compared with press-forming glass lens elements. It is thus possible to reduce the frequency of die replacement and the frequency of maintenance, and thus to reduce cost.

According to the invention, it is possible to realize an image-taking device provided with an image-taking lens system that is compact and has satisfactorily corrected aberrations.

According to the invention, it is possible to realize a portable terminal incorporating a compact image-taking device.

DESCRIPTION OF EMBODIMENTS

Embodiments of the present invention will be described below with reference to the accompanying drawings. It should be understood that the embodiments presented below are in no way meant to limit the invention. It should also be understood that any use mentioned, any term used, etc. do not imply limitation to what is specifically discussed there.

Figure 1:
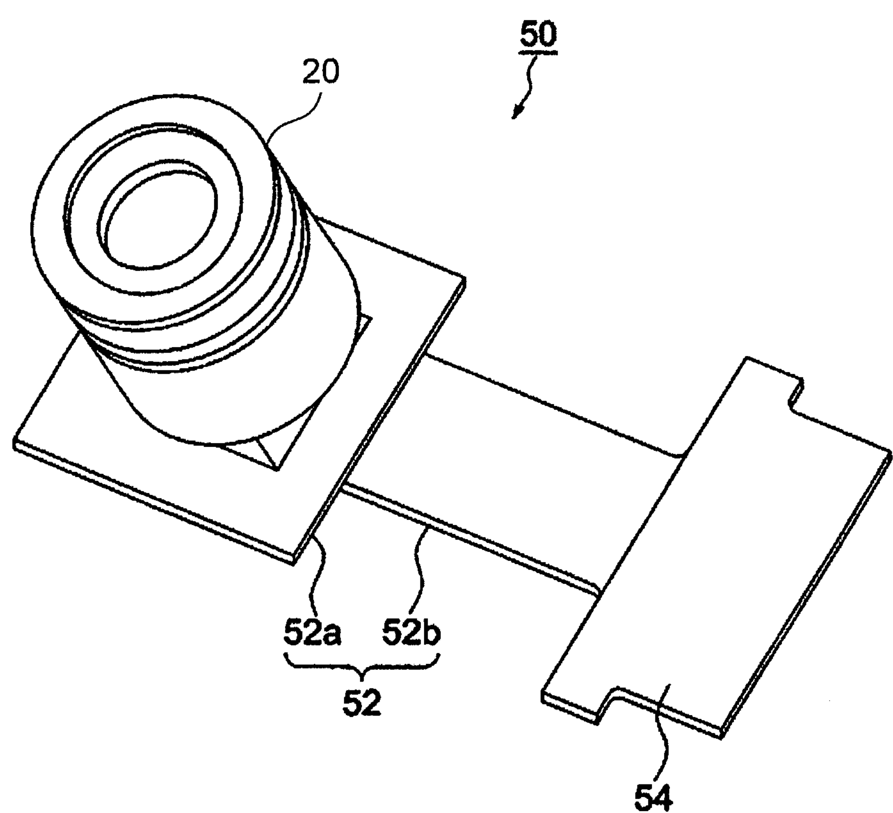
FIG. 1 is a perspective view of an image-taking device according to an embodiment of the invention.
Figure 2:
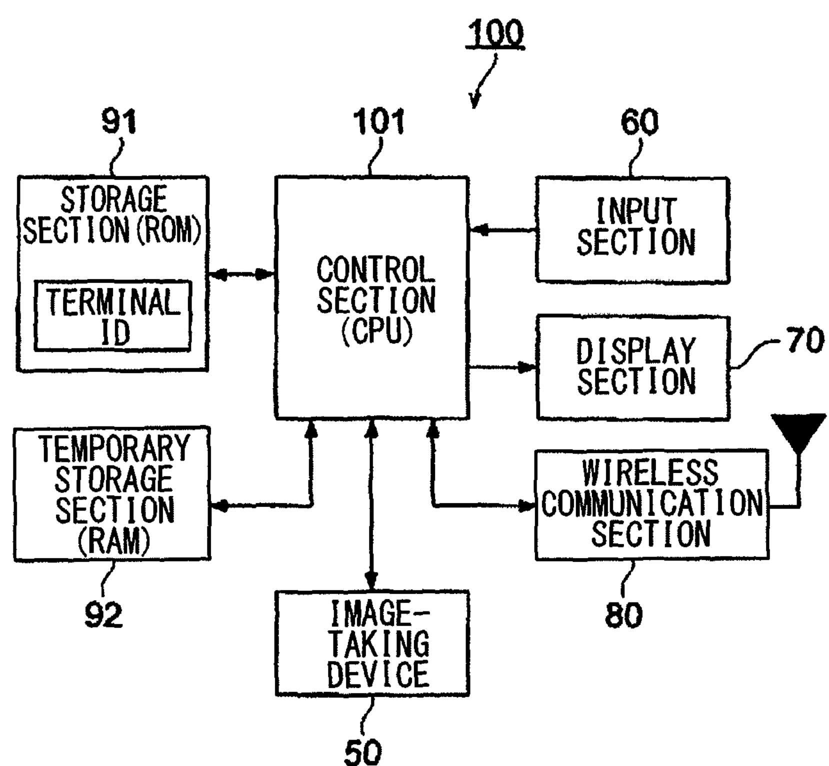
FIG. 2 is a block diagram of a cellular phone employing an image-taking device according to an embodiment of the invention.
Figure 3:
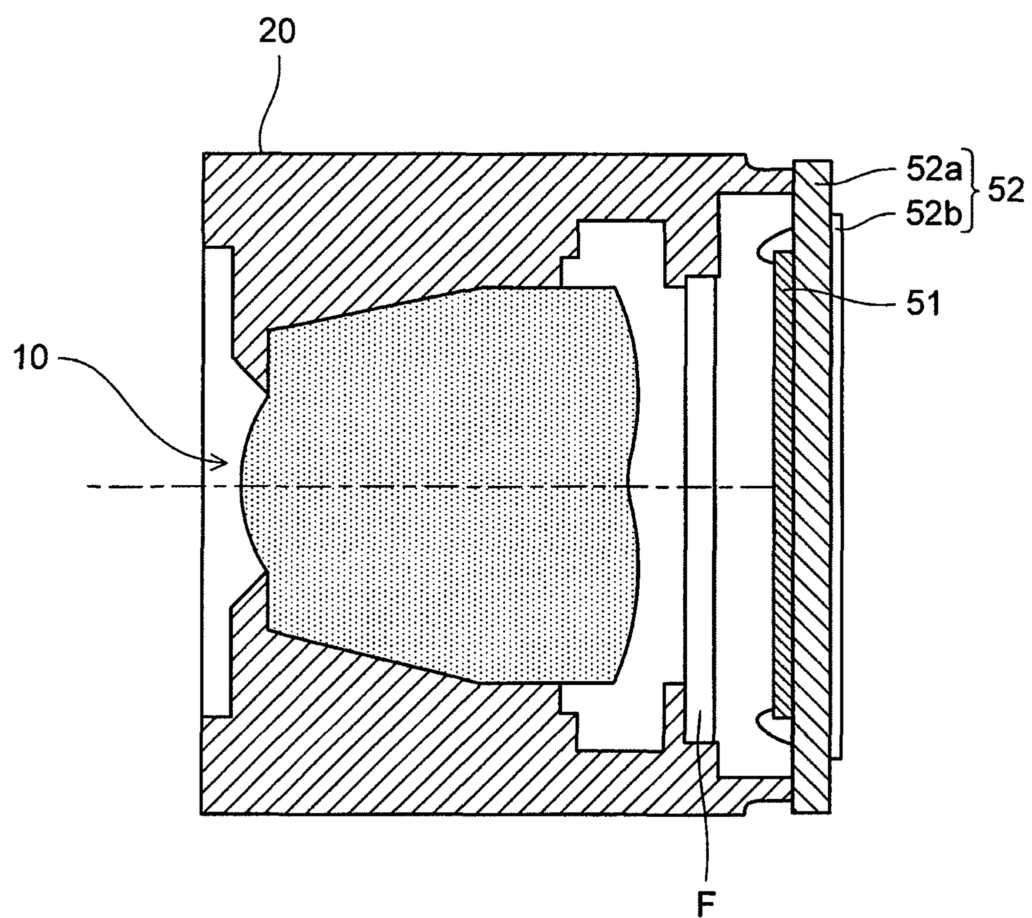
FIG. 3 is a sectional view of a lens barrel employed in an image-taking device according to an embodiment of the invention.

FIG. 1 is a perspective view of an image-taking device according to one embodiment of the invention. FIG. 2 is a block diagram of a cellular phone incorporating the image-taking device. FIG. 3 is a sectional view of a lens barrel which holds an image-taking lens system.

As shown in FIG. 1, the image-taking device 50 includes: a board 52 which holds an image sensor as an image-sensing element and which exchanges electrical signals with it; an external connection terminal 54 which is connected to the board 52; and a lens barrel 20 which holds an image-taking lens system. The board 52 has a support flat plate **52*a* and a flexible board 52*b*. The support flat plate 52*a* holds the image sensor. The flexible board 52*b* is, at one end, connected to the support flat plate 52*a* and, at the other end, connected to the external connection terminal 54. Via the external connection terminal 54, video signals, such as luminance and color-difference signals, obtained based on the light received by the image sensor through the image-taking lens system are output, to be delivered to a control section 101 in a cellular phone 100 shown in FIG. 2**.

As shown in FIG. 2, the cellular phone 100 as a portable terminal includes: a control section (CPU) 101 which controls different sections in a centralized fashion and which executes programs to achieve different types of processing; an input section 60 which accepts entry of data and instructions by means of keys; a display section 70 which displays predetermined data and taken pictures and videos; and a wireless communication section 80 which achieves communication of various kinds of information with an external server. The cellular phone 100 further includes: a storage section (ROM) 91 which stores a system program and different processing programs for the cellular phone 100 and data such as the terminal ID; a temporary storage section (RAM) 92 which is used as a working area for temporary storage of various processing programs executed by the control section 101, data being processed, taken-image data from the image-taking device 50, etc.; and the image-taking device 50. On the outside of the cellular phone 100, the display section 70, which comprises a liquid crystal display or the like, is provided and, at the back of the display section 70, the image-taking device 50 is provided.

As shown in FIG. 3, the lens barrel 20 is, at the right end, fixed to the support flat plate **52*a* with adhesive; thus, the lens barrel 20, along with the support flat plate 52*a*, encloses the image sensor 51. The lens barrel 20 and the support flat plate 52*a* shield light from the space formed inside them, so that the image sensor 51 fitted to the support flat plate 52*a* only receives light incident on it through the image-taking lens system 10**.

The image sensor 51 comprises a CMOS type image sensor as an image-sensing element. It has a light-receiving portion in which pixels (photoelectric conversion elements) are disposed in a two-dimensional array and a signal processing circuit which is formed around the light-receiving portion. The image sensor 51 may instead be a CCD-type image sensor. In the image sensor 51, the light-receiving portion performs photoelectric conversion on the subject light incident on it through the image-taking lens system 10, and the signal processing circuit performs A/D and other conversion on the resulting signal to convert them to video signals such as luminance and color-difference signals. The image sensor 51 is connected, by wires, to a large number of signal transfer pads provided on the surface of the support flat plate **52*a***. This permits the video signals to be delivered to the control section in the cellular phone.

The lens barrel 20 holds the image-taking lens system 10 in a fixed fashion. In a case where close-up shooting is allowed, however, the lens barrel 20 holds the focusing lens in the image-taking lens system 10 in a movable fashion, and additionally holds an actuator for moving the focusing lens along the optical axis.

Near the image sensor 51, the lens barrel 20 holds a filter F in a fixed fashion. The filter F comprises an IR cut filter, an optical low-pass filter, etc. The IR cut filter serves to cut infrared radiation and transmit visible light alone, and may be provided integrally with the package of the image sensor 51. The optical low-pass filter has predetermined cut-off frequency characteristics that depend on the pixel pitch of the image sensor 51, and serves to reduce color moiré in the image sensor 51. In a case where color moiré is negligible, the optical low-pass filter may be omitted. The lens barrel 20 also holds an unillustrated aperture stop.

Next, the construction of the image-taking lens system held in the lens barrel 20 will be described with reference to FIGS. 4 to 8. FIGS. 4 to 8 are sectional views of the image-taking lens system according to a first to a fifth embodiment of the invention, showing the lens element arrangement with the focus at infinity.

(First Embodiment)

Figure 4:
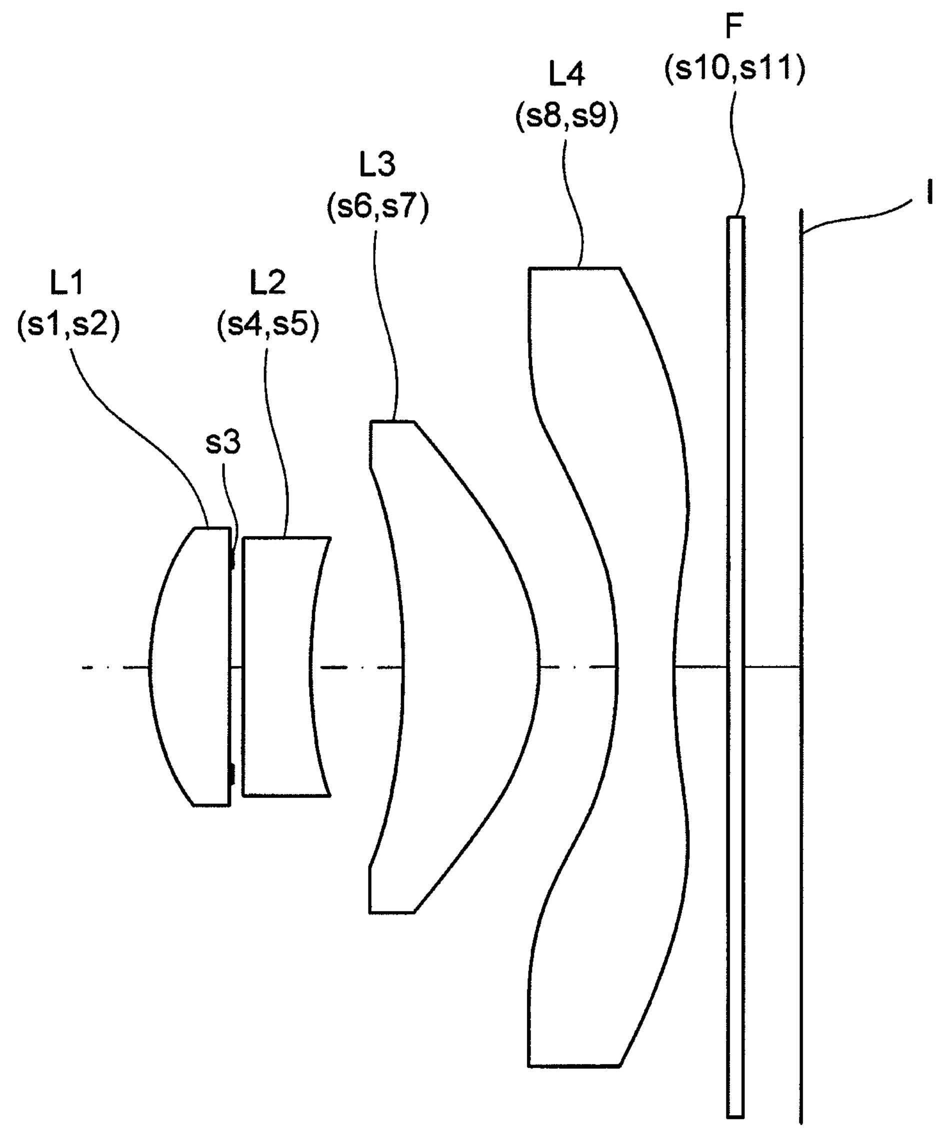
FIG. 4 is a sectional view of an image-taking lens system according to a first embodiment of the invention for use in an image-taking device according to the invention.

As shown in FIG. 4, the image-taking lens system is composed of, from the object side (subject side), a first lens element L1 having a biconvex shape and having a comparatively high refractive power at the object-side surface, an aperture stop s3, a second lens element L2 having a biconcave shape and having a comparatively high refractive power at the image-side surface, a third lens element L3 having a positive refractive power and having a meniscus shape with a convex surface facing the image side, and a fourth lens element L4 having a biconcave shape. The composite refractive power of the first to third lens elements L1 to L3 is positive. The reference sign F represents a filter such as an optical low-pass filter and an infrared cut filter, and the reference sign I represents the image plane on the image-sensing element.

The surfaces of the first to fourth lens elements are all aspherical. In particular, the aspherical surface at the image side of the fourth lens element L4 has a negative refractive power near the optical axis, has an increasingly low refractive power toward a peripheral part of the lens surface, and has an inflection point in the peripheral part of the lens surface. Here, an inflection point denotes, on a curve defining a sectional shape of a lens across its effective radius, wherever the tangent line to the curve perpendicularly intersects the optical axis, the intersection between the curve defining the sectional shape of the lens and the tangent line.

Moreover, the first to fourth lens elements L1 to L4 are formed of a resin material. The first, third, and fourth lens elements L1, L3, and L4 are made of a polyolefin-based resin, and the second lens L2 is made of a resin with a comparatively high refractive index and dispersion.

(Second Embodiment)

Figure 5:
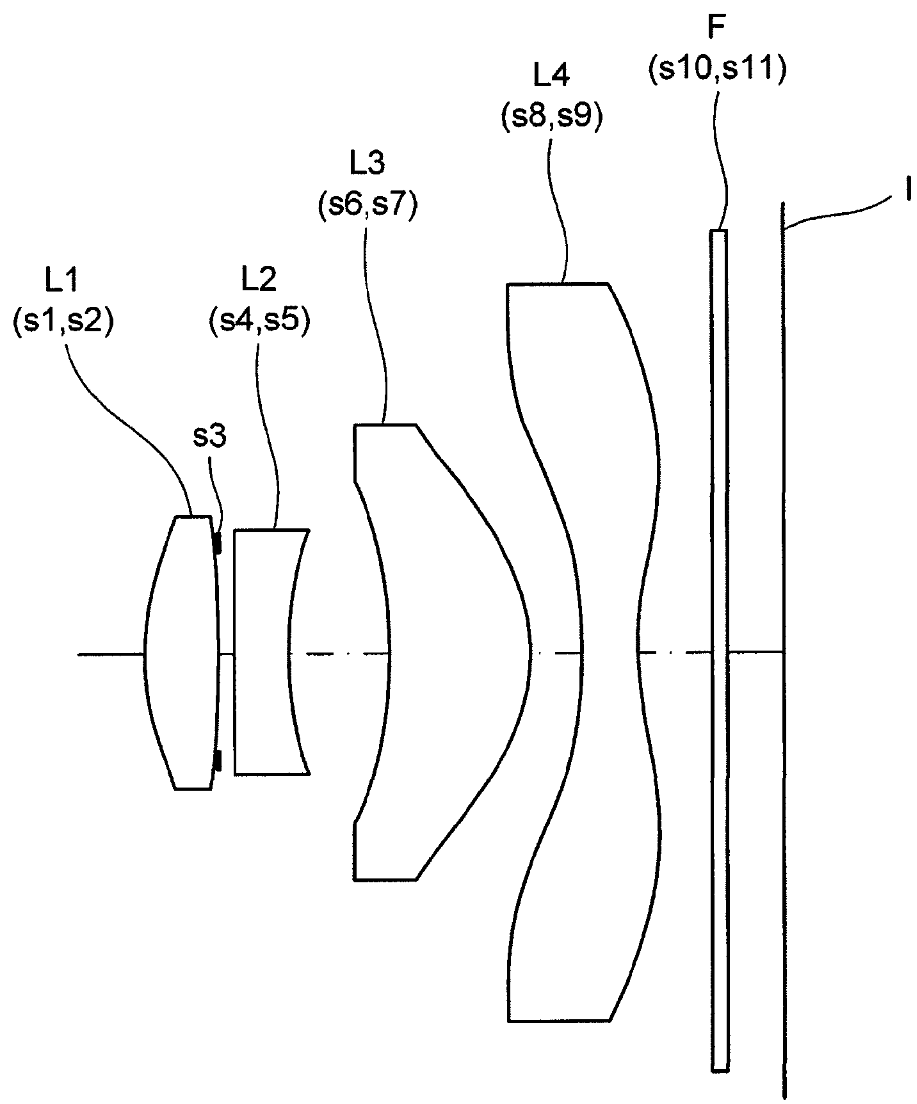
FIG. 5 is a sectional view of an image-taking lens system according to a second embodiment of the invention for use in an image-taking device according to the invention.

As shown in FIG. 5, the image-taking lens system is composed of, from the object side, a first lens element L1 having a biconvex shape and having a comparatively high refractive power at the object-side surface, an aperture stop s3, a second lens element L2 having a biconcave shape and having a comparatively high refractive power at the image-side surface, a third lens element L3 having a positive refractive power and having a meniscus shape with a convex surface facing the image side, and a fourth lens element L4 having a biconcave shape. The composite refractive power of the first to third lens elements L1 to L3 is positive.

The surfaces of the first to fourth lens elements are all aspherical. In particular, the aspherical surface at the image side of the fourth lens element L4 has a negative refractive power near the optical axis, has an increasingly low refractive power toward a peripheral part of the lens surface, and has an inflection point in the peripheral part of the lens surface.

Moreover, the first to fourth lens elements L1 to L4 are formed of a resin material. The first, third, and fourth lens elements L1, L3, and L4 are made of a polyolefin-based resin, and the second lens L2 is made of a resin with a comparatively high refractive index and dispersion.

(Third Embodiment)

Figure 6:
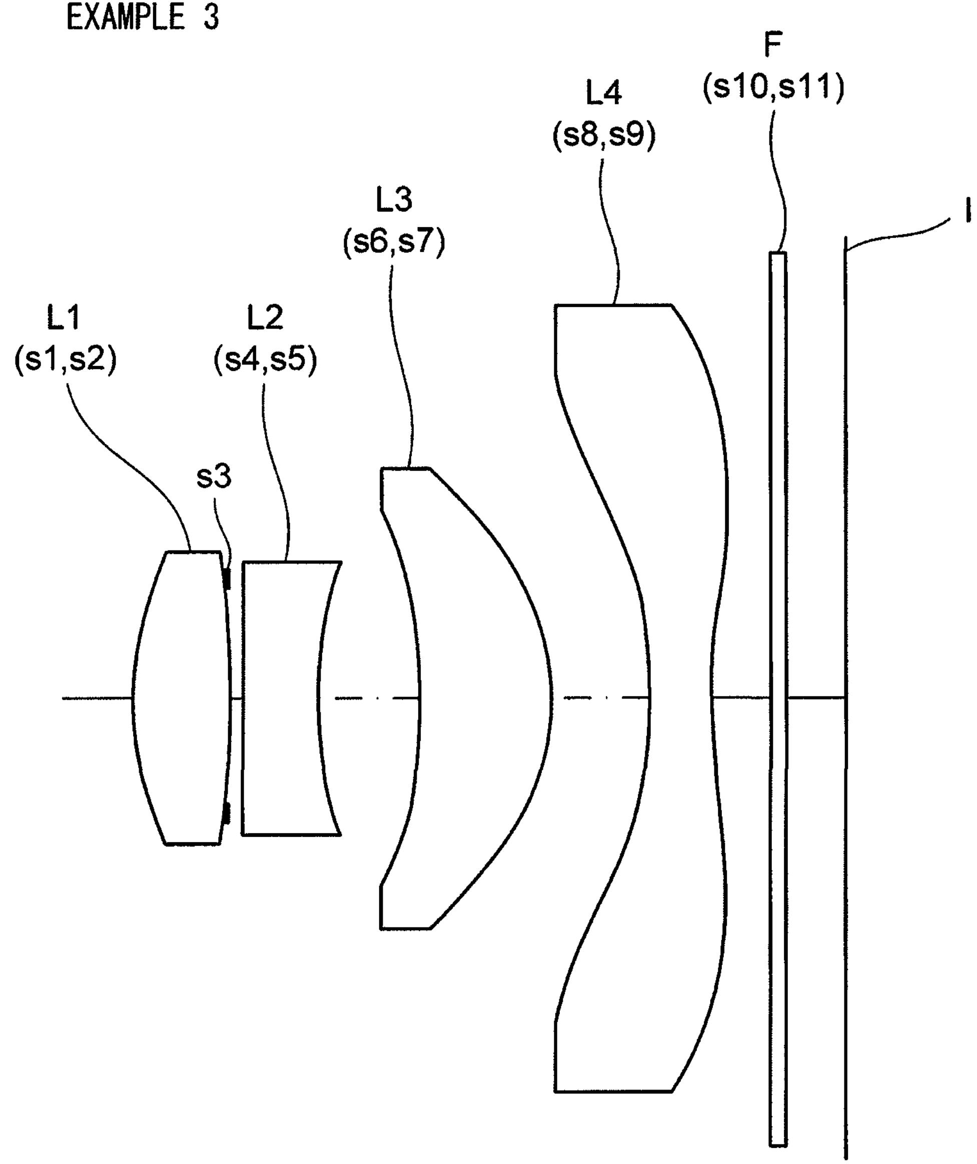
FIG. 6 is a sectional view of an image-taking lens system according to a third embodiment of the invention for use in an image-taking device according to the invention.

As shown in FIG. 6, the image-taking lens system is composed of, from the object side, a first lens element L1 having a biconvex shape and having a comparatively high refractive power at the object-side surface, an aperture stop s3, a second lens element L2 having a biconcave shape and having a comparatively high refractive power at the image-side surface, a third lens element L3 having a positive refractive power and having a meniscus shape with a convex surface facing the image side, and a fourth lens element L4 having a biconcave shape. The composite refractive power of the first to third lens elements L1 to L3 is positive.

The surfaces of the first to fourth lens elements are all aspherical. In particular, the aspherical surface at the image side of the fourth lens element L4 has a negative refractive power near the optical axis, has an increasingly low refractive power toward a peripheral part of the lens surface, and has an inflection point in the peripheral part of the lens surface.

Moreover, the first to fourth lens elements L1 to L4 are formed of a resin material. The first, third, and fourth lens elements L1, L3, and L4 are made of a polyolefin-based resin, and the second lens L2 is made of a resin with a comparatively high refractive index and dispersion.

(Fourth Embodiment)

Figure 7:
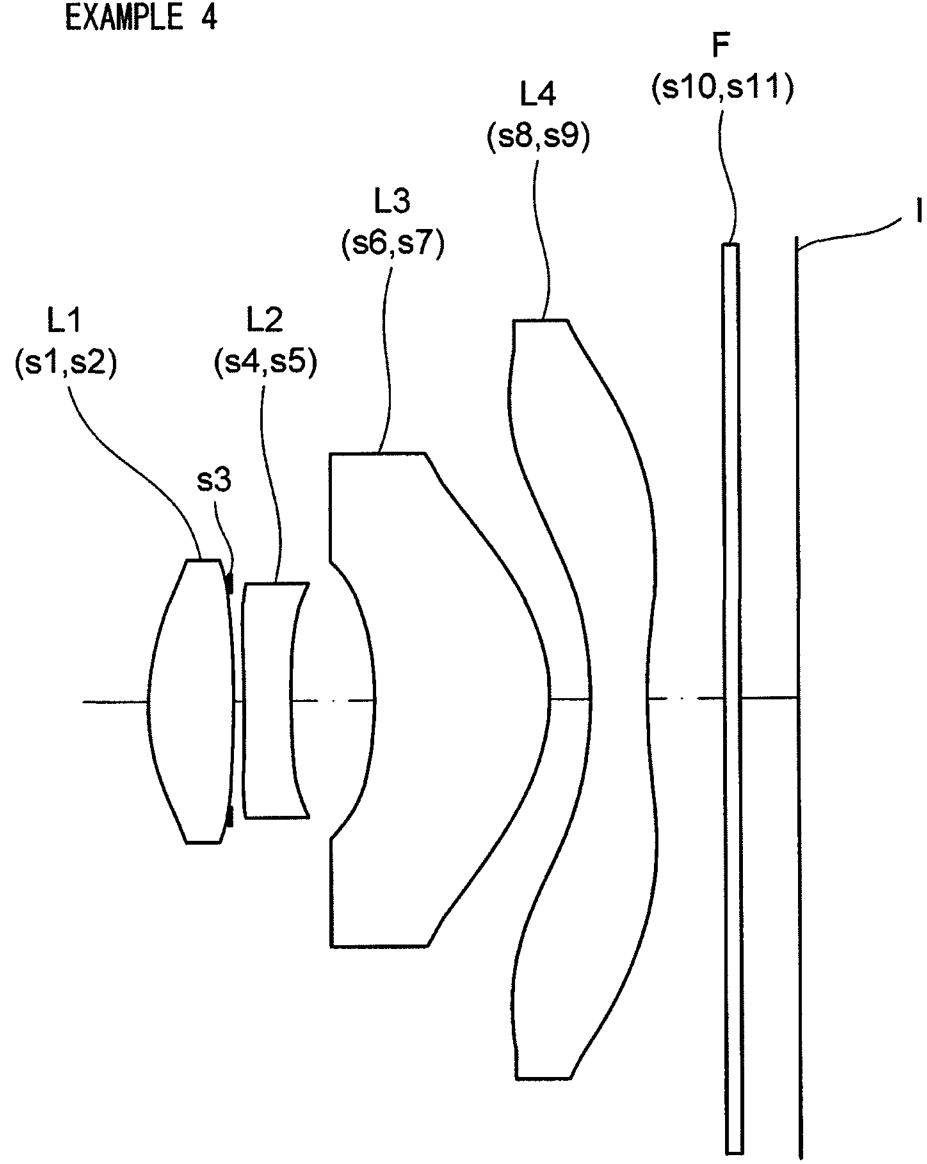
FIG. 7 is a sectional view of an image-taking lens system according to a fourth embodiment of the invention for use in an image-taking device according to the invention.

As shown in FIG. 7, the image-taking lens system is composed of, from the object side, a first lens element L1 having a biconvex shape and having a comparatively high refractive power at the object-side surface, an aperture stop s3, a second lens element L2 having a biconcave shape and having a comparatively high refractive power at the image-side surface, a third lens element L3 having a positive refractive power and having a meniscus shape with a convex surface facing the image side, and a fourth lens element L4 having a biconcave shape. The composite refractive power of the first to third lens elements L1 to L3 is positive.

The surfaces of the first to fourth lens elements are all aspherical. In particular, the aspherical surface at the image side of the fourth lens element L4 has a negative refractive power near the optical axis, has an increasingly low refractive power toward a peripheral part of the lens surface, and has an inflection point in the peripheral part of the lens surface.

Moreover, the first to fourth lens elements L1 to L4 are formed of a resin material. The first, third, and fourth lens elements L1, L3, and L4 are made of a polyolefin-based resin, and the second lens L2 is made of a resin with a comparatively high refractive index and dispersion.

(Fifth Embodiment)

Figure 8:
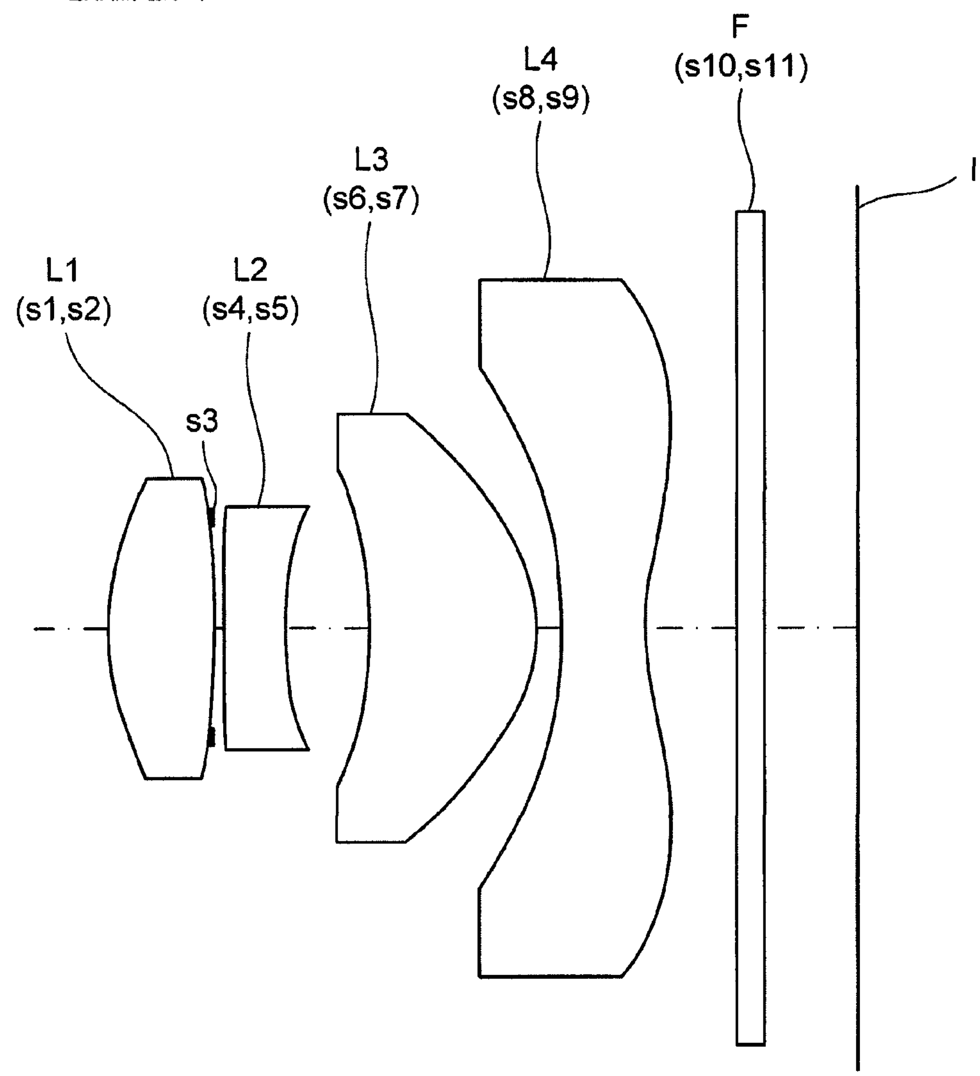
FIG. 8 is a sectional view of an image-taking lens system according to a fifth embodiment of the invention for use in an image-taking device according to the invention.
Figure 9:
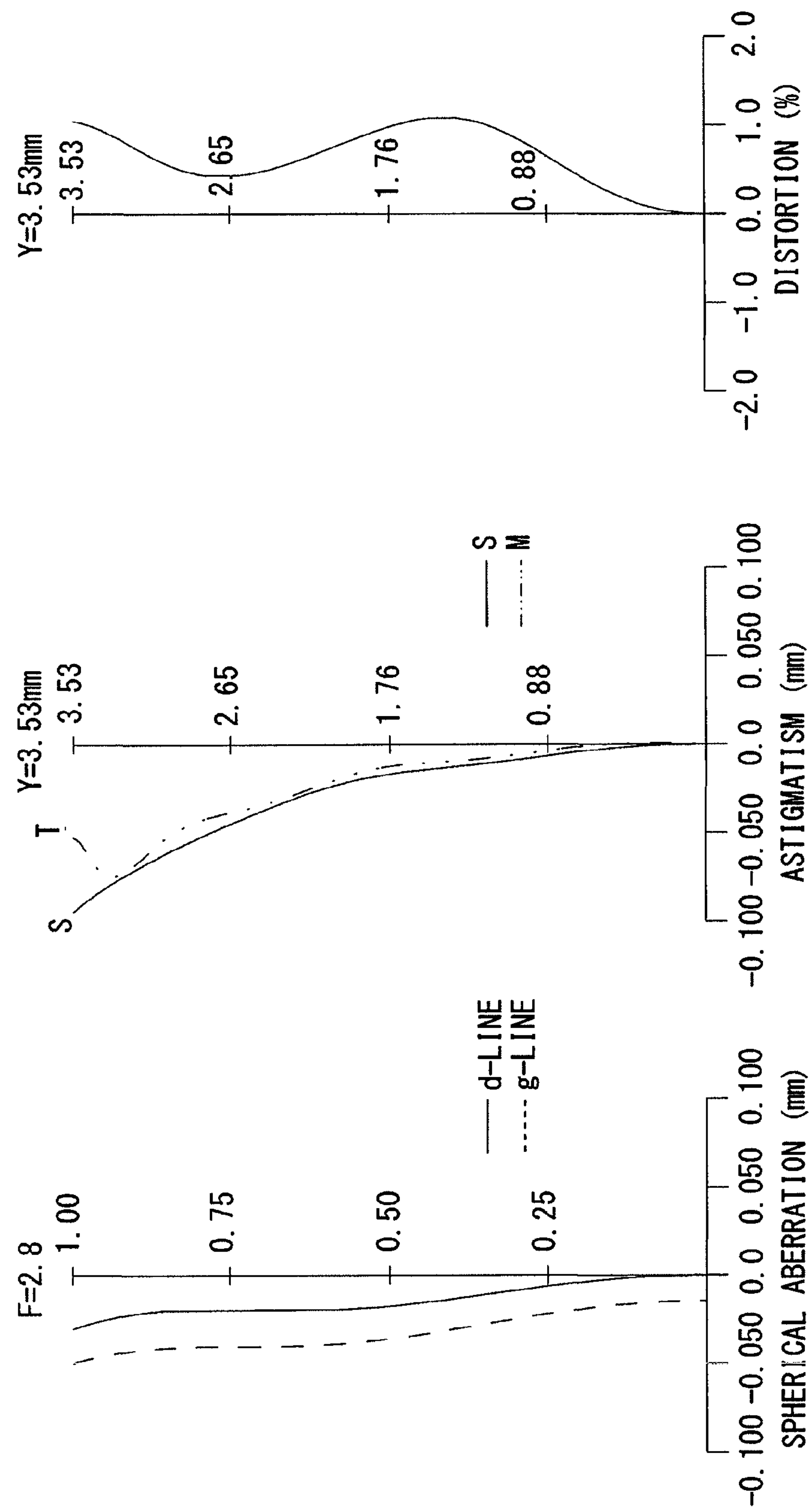
FIG. 9 is a diagram showing aberrations in the image-taking lens system according to the first embodiment of the invention.
Figure 10:
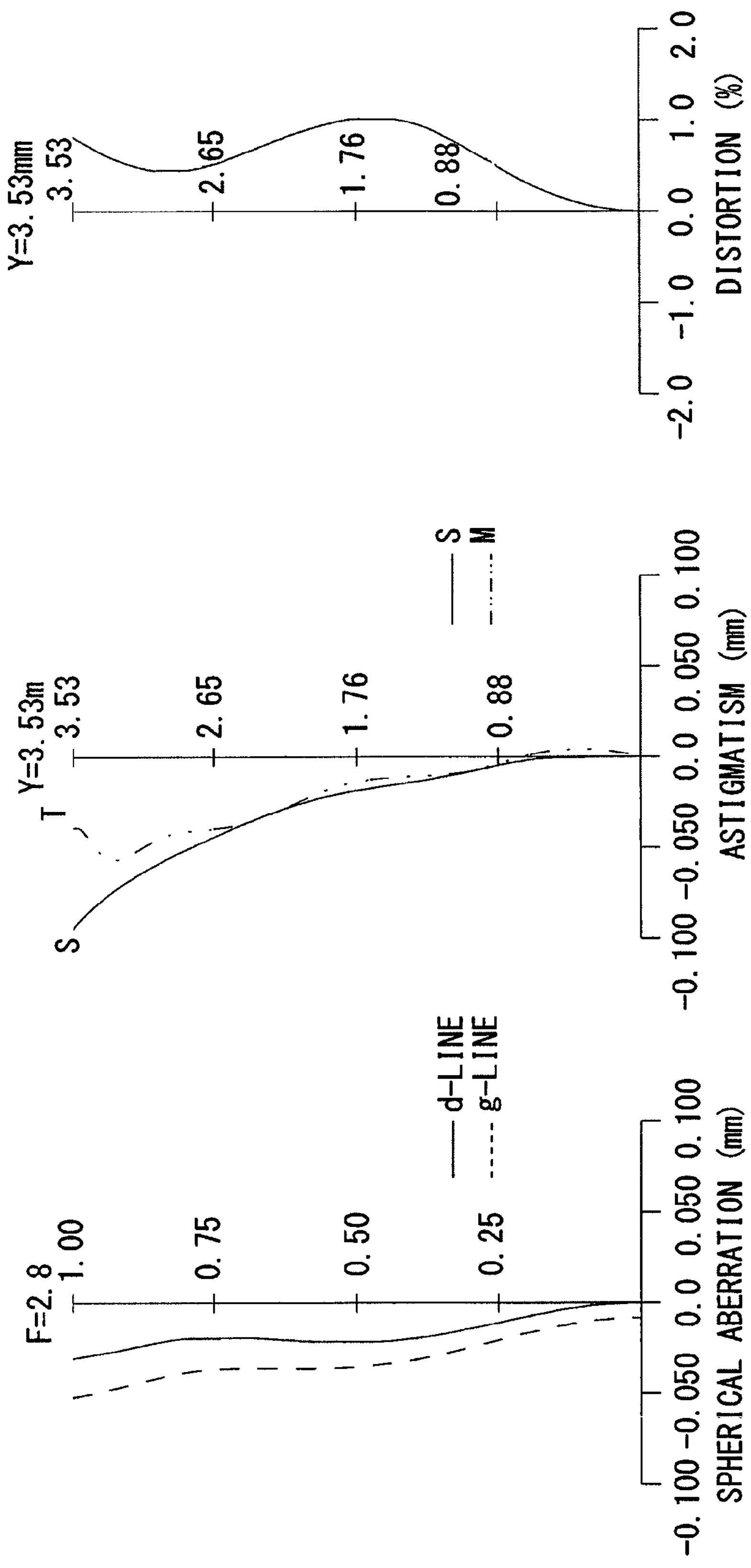
FIG. 10 is a diagram showing aberrations in the image-taking lens system according to the second embodiment of the invention.
Figure 11:
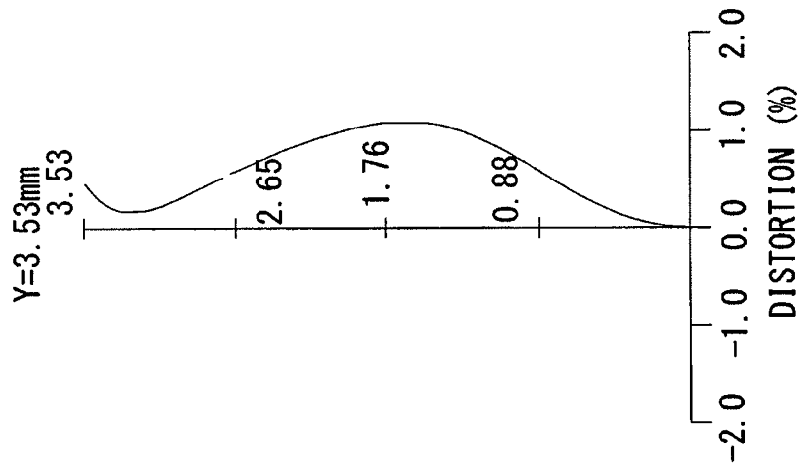
FIG. 11 is a diagram showing aberrations in the image-taking lens system according to the third embodiment of the invention.
Figure 11:
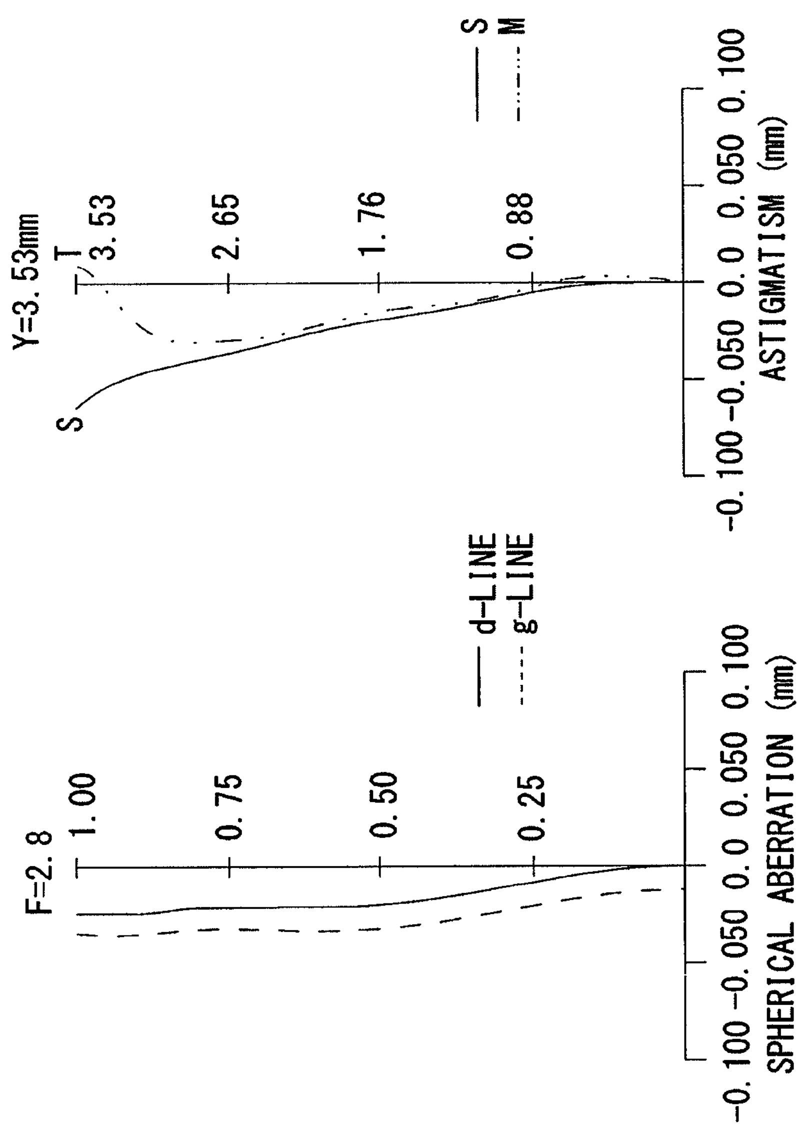
Figure 12:
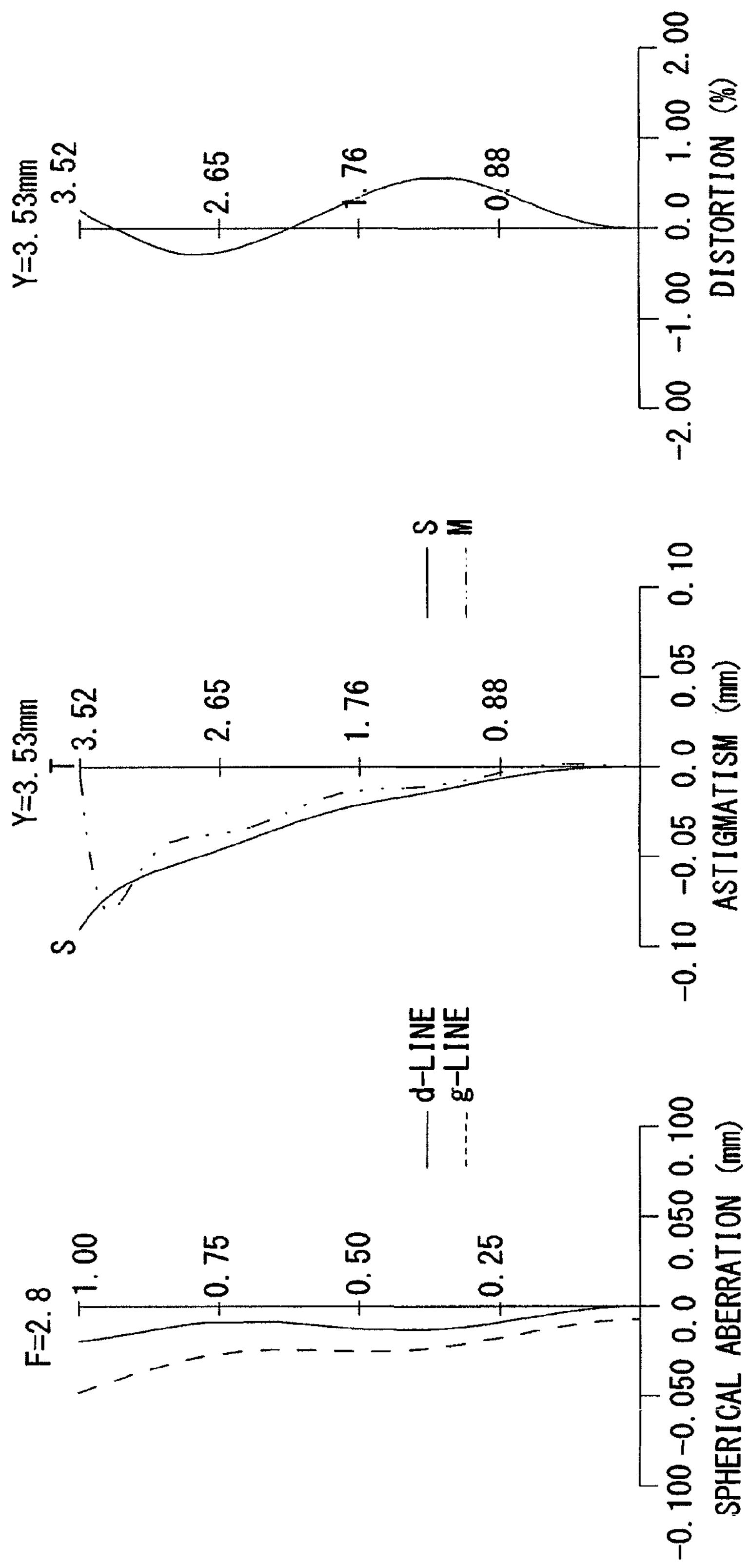
FIG. 12 is a diagram showing aberrations in the image-taking lens system according to the fourth embodiment of the invention.
Figure 13:
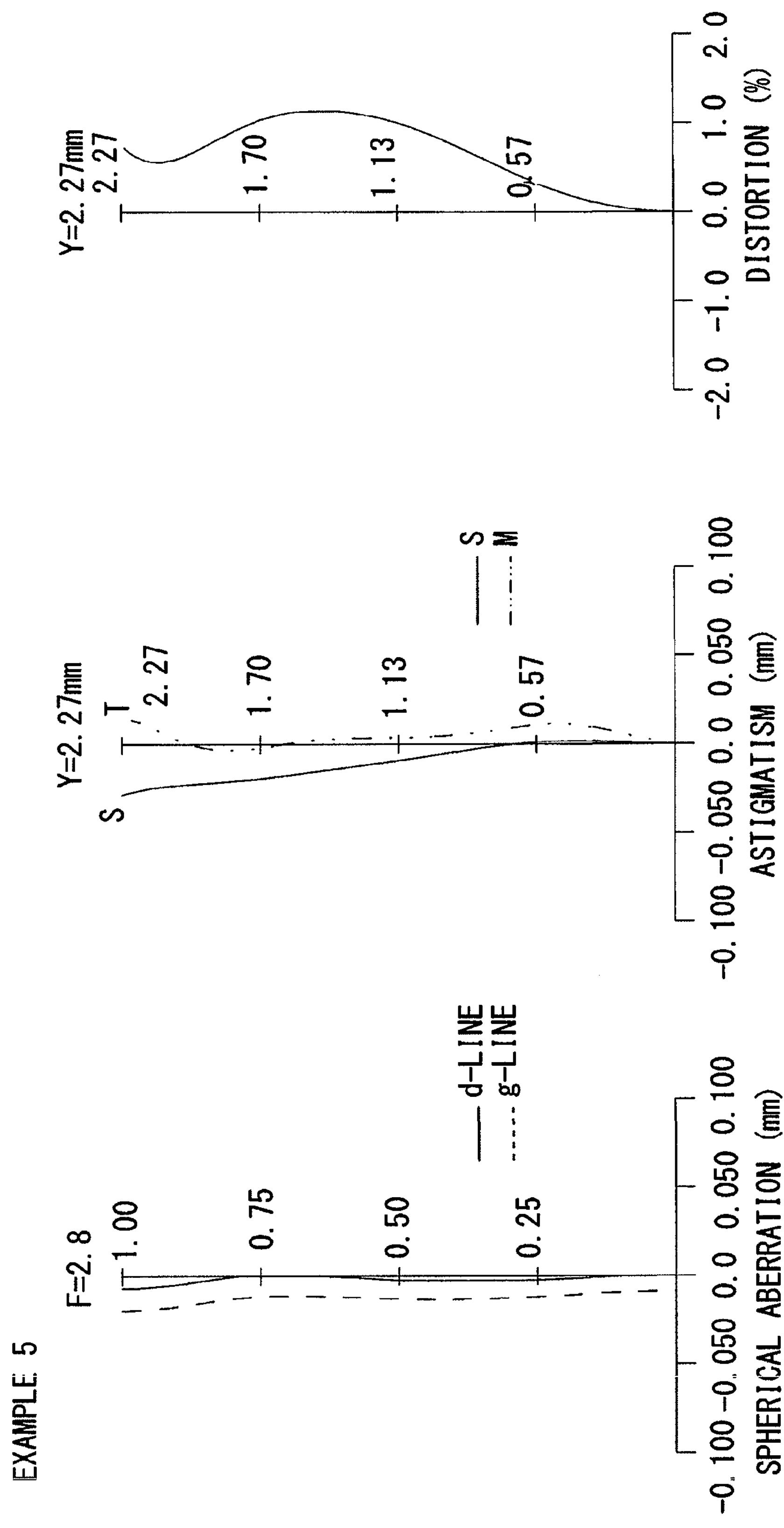
FIG. 13 is a diagram showing aberrations in the image-taking lens system according to the fifth embodiment of the invention.

As shown in FIG. 8, the image-taking lens system is composed of, from the object side, a first lens element L1 having a biconvex shape and having a comparatively high refractive power at the object-side surface, an aperture stop s3, a second lens element L2 having a biconcave shape and having a comparatively high refractive power at the image-side surface, a third lens element L3 having a positive refractive power and having a meniscus shape with a convex surface facing the image side, and a fourth lens element L4 having a biconcave shape. The composite refractive power of the first to third lens elements L1 to L3 is positive.

The surfaces of the first to fourth lens elements are all aspherical. In particular, the aspherical surface at the image side of the fourth lens element L4 has a negative refractive power near the optical axis, has an increasingly low refractive power toward a peripheral part of the lens surface, and has an inflection point in the peripheral part of the lens surface.

Moreover, the first to fourth lens elements L1 to L4 are formed of a resin material. The first, third, and fourth lens elements L1, L3, and L4 are made of a polyolefin-based resin, and the second lens L2 is made of a resin with a comparatively high refractive index and dispersion.

Thus, in the first to fifth embodiments, the image-taking lens system is composed of, from the object side, a first lens element L1 having a positive refractive power, an aperture stop s3, a second lens element L2 having a negative refractive power and having a concave surface facing the image side, a third lens element L3 having a positive refractive power, and a fourth lens element L4 having a negative refractive power and having a concave surface facing the image side.

In this way, by giving the first to third lens elements L1 to L3 a positive composite optical power and giving the fourth lens element L4, which is disposed on their image side, a negative refractive power, that is, by adopting a so-called telephoto type lens construction, it is possible to shorten the total length of the image-taking lens system.

Moreover, by giving two of the first to fourth lens elements, namely the second and fourth lens elements L2 and L4, a negative refractive power, it is possible to increase the number of divergent surfaces and thereby correct and reduce the Petzval sum. Furthermore, also by giving the second lens element L2 a concave lens surface at the image side, it is possible to correct the Petzval sum and thereby obtain satisfactory imaging performance even in a peripheral part of the image field.

Moreover, by giving the fourth lens element L4 a concave lens surface at the image side, it is possible to shorten the axial distance from the image-side lens surface of the fourth lens element L4 to the image plane (that is, the back focal length), and thus to shorten the total length of the image-taking lens system.

In the embodiments, the following formulae are fulfilled:

$$0.45<f3/f<0.95 \quad (1)$$

$$0.75<SIL/TL<0.95 \quad (2)$$

$$0.3<r1/f<0.45 \quad (3)$$

Here, f3 represents the focal length of the third lens element L3; f represents the focal length of the entire image-taking lens system; SIL represents the distance from the aperture stop plane to the image plane along the optical axis; TL represents the distance from the most object-side lens surface of the image-taking lens system to the image plane along the optical axis; and r1 represents the radius of curvature of the object-side lens surface of the first lens element L1.

Formula (1) defines an adequate range for the focal length of the third lens element L3. Under the lower limit of Formula (1), the refractive power of the third lens element L3 is excessively high, and thus it is difficult to correct high-order spherical aberration and coma. On the other hand, over the upper limit of Formula (1), the refractive power is excessively low, and thus it is difficult to shorten the total length of the image-taking lens system. When Formula (1) is fulfilled the image-taking lens system is compact, and aberrations can be corrected satisfactorily.

To better gain the benefits mentioned above, it is further preferable that the following formula (1A) be fulfilled:

$$0.46<f3/f<0.86 \quad (1A)$$

To still better gain the benefits mentioned above, it is still further preferable that the following formula (1B) be fulfilled:

$$0.50<f3/f<0.80 \quad (1B)$$

Formula (2) defines an adequate position of the aperture stop s3 between the first and second lens elements L1 and L2. Under the lower limit of Formula (2), the aperture stop s3 is excessively close to the image side, and thus it is difficult to make the light beam incident on the image plane telecentric. On the other hand, over the upper limit of Formula (2), the aperture stop s3 is excessively far away from the center of the image-taking lens system, and thus it is impossible to achieve symmetry between the object-side and image-side lens elements about the aperture stop s3; thus, it is difficult to correct distortion and lateral chromatic aberration (transverse chromatic aberration). When Formula (2) is fulfilled, the light beam incident on the image plane is made telecentric, and distortion and lateral chromatic aberration can be corrected satisfactorily.

To better gain the benefits mentioned above, it is further preferable that the following formula (2A) be fulfilled:

$$0.81<SIL/TL<0.91 \quad (2A)$$

To still better gain the benefits mentioned above, it is still further preferable that the following formula (2B) be fulfilled:

$$0.84<SIL/TL<0.89 \quad (2B)$$

Formula (3) defines an adequate range for the radius of curvature r1 of the object-side lens surface of the first lens element L1. Under the lower limit of Formula (3), the object-side lens surface of the first lens element L1 has an excessively high refractive power, and thus it is difficult to correct high-order spherical aberration and coma occurring in the first lens element L1. On the other hand, over the higher limit of Formula (3), the object-side lens surface of the first lens element L1 has an excessively low refractive power, and thus it is difficult to locate the composite principal point of the first and second lens elements L1 and L2 closer to the object side; thus, the image-taking lens system has an increased total length. When Formula (3) is fulfilled, the image-taking lens system is compact, and aberrations can be corrected satisfactorily.

To better gain the benefits mentioned above, it is further preferable that the following formula (3A) be fulfilled:

$$0.32<r1/f<0.44 \quad (3A)$$

To still better gain the benefits mentioned above, it is still further preferable that the following formula (3B) be fulfilled:

$$0.35<r1/f<0.42 \quad (3B)$$

Furthermore, in the embodiments, the following formula is fulfilled:

$$15<\nu2<31 \quad (4)$$

Here, ν2 represents the Abbe number of the second lens element L2.

Formula (4) defines an adequate range for the Abbe number of the second lens element L2. Using a material with a comparatively high dispersion in the second lens element L2 makes it possible to correct axial chromatic aberration (longitudinal chromatic aberration). Doing so, however, in a construction where, as in the embodiments, the image-side lens surface of the second lens element L2 is a highly divergent surface, simultaneously increases the angles of incidence of the rays in a peripheral part of the lens, producing lateral chromatic aberration. That is, under the lower limit of Formula (4), axial chromatic aberration can be corrected satisfactorily, but the lateral chromatic aberration occurring in a peripheral part of the light beam is larger. On the other hand, over the upper limit of Formula (4), the lateral chromatic aberration occurring in a peripheral part of the light beam can be reduced, but axial chromatic aberration cannot be corrected satisfactorily. When Formula (4) is fulfilled, both axial chromatic aberration and lateral chromatic aberration can be corrected satisfactorily.

To better gain the benefits mentioned above, it is further preferable that the following formula (4A) be fulfilled:

$$17<\nu 2<27 \tag{4A}$$

To still better gain the benefits mentioned above, it is still further preferable that the following formula (4B) be fulfilled:

$$19<\nu 2<25 \tag{4B}$$

Furthermore, in the embodiments, the following formula is fulfilled:

$$0.2<T3/f<0.34 \tag{5}$$

Here, T3 represents the thickness of the third lens element L3 along the optical axis, and f represents the focal length of the entire image-taking lens system.

Formula (5) defines an adequate range for the thickness of the third lens element L3 along the optical axis. Under the lower limit of Formula (5), the thickness of the third lens element L3 along the optical axis is excessively small, and thus the third lens element L3 has a long focal length; this makes it difficult to shorten the total length of the image-taking lens system. On the other hand, over the upper limit of Formula (5), the third lens element L3 has an excessively large thickness along the optical axis, and thus the third lens element L3 has a high refractive power; this makes it difficult to reduce high-order spherical aberration and coma. When Formula (5) is fulfilled, the image-taking lens system is compact, and aberrations can be corrected satisfactorily.

To better gain the benefits mentioned above, it is further preferable that the following formula (5A) be fulfilled:

$$0.21<T3/f<0.31 \tag{5A}$$

To still better gain the benefits mentioned above, it is still further preferable that the following formula (5B) be fulfilled:

$$0.23<T3/f<0.28 \tag{5B}$$

Furthermore, in the embodiments, the following formula is fulfilled:

$$0.05<T4/f<0.17 \tag{6}$$

Here, T4 represents the thickness of the fourth lens element L4 along the optical axis, and f represents the focal length of the entire image-taking lens system.

Formula (6) defines an adequate range for the thickness of the fourth lens element L4 along the optical axis. The fourth lens element L4 is disposed close to the image plane, and has a large effective diameter. Its refractive power thus varies greatly between near the optical axis and in a peripheral part of the lens element, and its thickness along the optical axis greatly affects field curvature. Over the upper limit or under the lower limit of Formula (6), the image-taking lens system has an image field that is curved excessively to the over or under side. When Formula (6) is fulfilled, the image-taking lens system has a satisfactory image field.

To better gain the benefits mentioned above, it is further preferable that the following formula (6A) be fulfilled:

$$0.08<T4/f<0.15 \tag{6A}$$

To still better gain the benefits mentioned above, it is still further preferable that the following formula (6B) be fulfilled:

$$0.09<T4/f<0.11 \tag{6B}$$

Furthermore, in the embodiments, the following formula is fulfilled:

$$0.3<T4/SG4<0.6 \tag{7}$$

Here, T4 represents the thickness of the fourth lens element L4 along the optical axis, and SG4 represents the thickness of the fourth lens element L4 at its thickest part.

Formula (7) defines adequate ranges for the thickness of the fourth lens element L4 along the optical axis and at its thickest part to give the fourth lens element L4 an adequate refractive power in its paraxial and peripheral parts. Under the lower limit of Formula (7), the difference in refractive power between the paraxial and peripheral parts is excessively large, and thus it is difficult to properly correct field curvature. On the other hand, over the lower limit of the Formula (7), the difference in refractive power between the paraxial and peripheral parts is excessively small, and thus it is difficult to make peripheral rays telecentric and to correct coma in peripheral rays.

To better gain the benefits mentioned above, it is further preferable that the following formula (6A) be fulfilled:

$$0.35<T4/SG4<0.55 \tag{7A}$$

To still better gain the benefits mentioned above, it is still further preferable that the following formula (6B) be fulfilled:

$$0.38<T4/SG4<0.48 \tag{7B}$$

Furthermore, in the embodiments, the fourth lens element L4 is a biconcave lens element.

In this construction, both surfaces of the fourth lens element L4 contribute to its refractive power, and this prevents a peripheral part of the image-side lens surface of the fourth lens element L4 from greatly protruding toward the image plane side. Typically, between the fourth lens element L4, which is the most image-side lower limit, and the image sensor, a filter F such as an optical low-pass filter and an infrared cut filter is disposed. If the fourth lens element L4 has a peripheral part protruding toward the image side, to prevent it from interfering with the filter F, the back focal length needs to be increased. In the embodiments, there is no need to do so; the back focal length can be shortened, and the image-taking lens system can be made compact.

Furthermore, in the embodiments, the image-side lens surface of the fourth lens element L4 has an aspherical shape. This aspherical surface has a negative refractive power near the optical axis, has an increasingly low negative refractive power toward a peripheral part of the lens surface, and has an inflection point in the peripheral part of the lens surface. It should be noted that an inflection point denotes, on a curve defining a sectional shape of a lens across its effective radius, wherever the tangent line to the curve perpendicularly intersects the optical axis, the intersection between the curve defining the sectional shape of the lens and the tangent line.

With this construction, in a peripheral part of the image-side lens surface of the fourth lens element L4, the principal rays are incident on the image plane at small angles of incidence, and thus the light beam incident on the image plane is made telecentric. Moreover, the image-side lens surface of the third lens element L3 no longer needs to be given an excessively low negative refractive power in a peripheral part, and thus off-axial aberration can be corrected satisfactorily.

Furthermore, in the embodiments, the first to forth lens elements L1 and L4 are formed of a resin material.

With the aim of making image-taking devices compact, there have been developed image-sensing elements with reduced image-sensing areas and reduced pixel pitches. In image-taking lens systems designed for such image-sensing elements, the focal length of the entire system needs to be comparatively short, and accordingly the individual lens elements have extremely small radii of curvature and diameters. By forming all the lens elements out of a resin material as mentioned above, it is possible to mass-produce even lens elements with small radii of curvature and diameters inexpensively by injection molding. Moreover, resin lens elements can be molded at comparatively low temperatures, and this helps reduce wear on dies for molding lens elements as compared with press-forming glass lens elements. It is thus possible to reduce the frequency of die replacement and the frequency of maintenance, and thus to reduce cost.

However, if the first to fourth lens elements L1 to L4 are all formed of resin, when the ambient temperature of the image-taking lens system varies, the refractive indices of the resin lens elements vary, and thus, inconveniently, the imaging point of the image-taking lens system moves along the optical axis.

This inconvenience results from the refractive index of a resin material varying greatly as temperature varies. It is today known that, when a resin material is mixed with inorganic fine particles, the refractive index of the composite resin material varies less as temperature varies. Specifically, as temperature rises, while the refractive index of the resin material decreases, the refractive index of the inorganic fine particles increases. Thus, by mixing a resin material with inorganic fine particles so that, due to opposite temperature dependence, their respective refractive indices vary in a way to cancel the variation of each other, it is possible to almost get rid of variation in the overall refractive index. Simply adding inorganic fine particles to a transparent resin material, however, causes light to scatter and reduces transmittance, making the resulting material unsuitable as optical material. By giving the inorganic fine particles a size smaller than the wavelength of the light transmitted, it is possible to substantially eliminate the scattering of light.

Specifically, by dispersing organic fine particles with a maximum particle length of 20 nm or less in a resin material as a base material, it is possible to obtain, with no loss in transmittance, a mixed resin material of which the refractive index has extremely low temperature dependence. For example, by dispersing fine particles of niobium oxide ($Nb_2O_5$) in acrylic resin, it is possible to reduce the variation of the refractive index with variation in temperature. In the embodiments, by using a mixed resin material having such organic fine particles dispersed in it in a lens element having a comparatively high positive refractive power, like the first lens element L1 and the third lens element L3, or in all the first to fourth lens elements L1 to L4, it is possible to reduce the movement of the imaging position of the image-taking lens system against temperature variation.

In a case where the light beam incident on the image plane cannot be made sufficiently telecentric, by varying the pitch at which a plurality of color filters or an array of on-chip microlenses are arranged in front of the individual pixels of the image sensor, it is possible to alleviate shading. Specially, near the optical axis, the color filters or on-chip micro lenses are arranged at the same pitch as the pixels of the image sensor; in contrast, the farther away from the optical axis, the color filters or on-chip microlenses are arranged at increasingly smaller pitch relative to the pitch of the pixels of the image sensor. With this structure, the closer to a peripheral part of the image-sensing area, the more the light beam obliquely incident on the image-sensing area is refracted by the on-chip microlenses so as to be made less obliquely incident before reaching the light-receiving portion of the pixels, and thus shading is reduced. By correcting shading in the image-sensing element in this way, it is possible to make the image-taking lens system compact, and hence the image-taking device compact.

EXAMPLES

The present invention will now be described in more detail by way of practical examples (Examples 1 to 5). It should be understood that the examples presented below are in no way meant to limit the invention. Examples 1 to 5 respectively correspond to the first to fifth embodiments described above, and to FIGS. 4 to 8.

The lens construction and specifications of each example are presented in the form of a set of surface data, aspherical surface data, overall data, and single lens data.

The surface data contains, for each surface, the following data wherever available, in separate columns from left to right: the surface number s, the radius of curvature r (in mm) the axial surface-to-surface distance d (in mm), the refractive index for d-line (with a wavelength of 587.56 nm), and the Abbe number for d-line. An asterisk (*) suffixed to a surface number indicates that the surface is aspherical.

An aspherical surface is defined by Formula 1 below.

$$X = \frac{h^2/R}{1+\sqrt{1-(1+K)h^2/R^2}} + \sum A_i h^i \quad \text{[Formula 1]}$$

Here, h represents the height in the direction perpendicular to the optical axis; X represents the displacement along the optical axis at the height h; R represents the paraxial radius of curvature; K represents the conic constant; and A, represents the aspherical surface coefficient of order i. The aspherical surface data contains, for each aspherical surface, the conic constant K and the aspherical surface coefficient Ai of order i, where “E” (for example, in “2.5E−03”) stands for the power of ten (for example, “2.5×10−3”).

The symbols used in the overall data are as follows:

f represents the focal length (in mm) of the entire image-taking lens system;

Fno. represents the f-number;

ω represents the half view angle (in degrees);

y'max represents the image height (in mm);

TL represents the total length (in mm) of the image-taking lens system; and

BF represents the back focal length (mm).

The back focal length (BF) is the axial distance from the image-side surface of the Filter F to the image plane. The total length (TL) of the image-taking lens system equals the axial distance from the most front lens surface to the image-side surface of the filter F plus the back focal length Example 1

| Unit: mm | | | | |
|---|---|---|---|---|
| [Surface Data] | | | | |
| Surface No. (s) | r | d | nd | νd |
| Object Plane | ∞ | ∞ | | |
| 1* | 1.816 | 0.689 | 1.5447 | 56.2 |
| 2* | 1.124E+06 | 0.026 | | |
| 3(Aperture) | ∞ | 0.101 | | |
| 4* | −25.691 | 0.588 | 1.6320 | 23.4 |
| 5* | 4.111 | 0.834 | | |
| 6* | −5.771 | 1.165 | 1.5447 | 56.2 |
| 7* | −1.531 | 0.667 | | |
| 8* | −4.817 | 0.500 | 1.5447 | 56.2 |
| 9* | 2.375 | 0.484 | | |
| 10 | ∞ | 0.145 | 1.5163 | 64.1 |
| 11 | ∞ | | | |
| Image Plane | ∞ | | | |

[Aspherical Surface Data]

Surface 1

K = −0.83790E−01, A4 = 0.10287E−01, A6 = 0.40833E−02, A8 = 0.30554E−02, A10 = 0.36443E−02

Surface 2

K = −0.50001E+02, A4 = 0.56254E−01, A6 = −0.18541E−01, A8 = 0.61624E−02, A10 = −0.29090E−02

Surface 4

K = 0.49999E+02, A4 = 0.66688E−01, A6 = −0.44421E−01, A8 = −0.12524E−01, A10 = 0.29366E−01, A12 = −0.22744E−01

Surface 5

K = −0.29162E+01, A4 = 0.67961E−01, A6 = 0.30382E−02, A8 = −0.37774E−01, A10 = 0.41627E−01 A12 = −0.13557E−01

Surface 6

K = −0.11580E+02, A4 = −0.21222E−01, A6 = −0.19621E−01, A8 = 0.18968E−01, A10 = −0.75413E−02 A12 = 0.12527E−02

Surface 7

K = −0.45778E+01, A4 = −0.10428E+00, A6 = 0.50051E−01, A8 = −0.25796E−01, A10 = 0.85558E−02 A12 = −0.10269E−02

Surface 8

K = 0.52630E−01, A4 = −0.89642E−01, A6 = 0.26541E−01, A8 = −0.97550E−03, A10 = −0.49329E−03 A12 = 0.72438E−04, A14 = −0.31112E−05

Surface 9

K = −0.12208E+02, A4 = −0.51175E−01, A6 = 0.12227E−01, A8 = −0.20305E−02, A10 = 0.20147E−03 A12 = −0.98778E−05, A14 = 0.16620E−06

[Overall Data]

| | |
|---|---|
| f | 4.888 |
| Fno. | 2.8 |
| ω | 35.6 |
| y'max | 3.528 |
| TL | 5.7 |
| BF | 0.5 |

[Single Lens Data]

| Lens Element | Starting Surface | Focal Length |
|---|---|---|
| 1 | 1 | 3.334 |
| 2 | 4 | −5.565 |

-continued

| Unit: mm | | |
|---|---|---|
| 3 | 6 | 3.489 |
| 4 | 8 | −2.851 |

Example 2

| Unit: mm | | | | |
|---|---|---|---|---|
| [Surface Data] | | | | |
| Surface No. (s) | r | d | nd | νd |
| Object Plane | ∞ | ∞ | | |
| 1* | 1.954 | 0.660 | 1.5447 | 56.2 |
| 2* | −11.137 | −0.014 | | |
| 3(Aperture) | ∞ | 0.145 | | |
| 4* | −17.768 | 0.495 | 1.6320 | 23.4 |
| 5* | 4.310 | 0.893 | | |
| 6* | −4.507 | 1.253 | 1.5447 | 56.2 |
| 7* | −1.325 | 0.454 | | |
| 8* | −5.629 | 0.500 | 1.5447 | 56.2 |
| 9* | 1.870 | 0.669 | | |
| 10 | ∞ | 0.145 | 1.5163 | 64.1 |
| 11 | ∞ | | | |
| Image Plane | ∞ | | | |

[Aspherical Surface Data]

Surface 1

K = −0.41447E+00, A4 = 0.82113E−03, A6 = −0.17183E−01, A8 = 0.17099E−01, A10 = −0.15795E−01

Surface 2

K = −0.16345E+02, A4 = 0.31074E−01, A6 = −0.29083E−01, A8 = −0.12385E−01, A10 = 0.51158E−02

Surface 4

K = 0.50000E+02, A4 = 0.93526E−01, A6 = −0.50897E−01, A8 = −0.19591E−03, A10 = 0.25374E−01, A12 = −0.13008E−01

Surface 5

K = −0.10094E+01, A4 = 0.84431E−01, A6 = 0.23185E−03, A8 = −0.33866E−01, A10 = 0.48761E−01, A12 = −0.17606E−01

Surface 6

K = −0.17117E+02, A4 = −0.40153E−01, A6 = −0.24438E−01, A8 = 0.28161E−01, A10 = −0.15547E−01, A12 = 0.37649E−02

Surface 7

K = −0.43889E+01, A4 = −0.10654E+00, A6 = 0.53838E−01, A8 = −0.27179E−01, A10 = 0.85696E−02, A12 = −0.96812E−03

Surface 8

K = −0.39177E+02, A4 = −0.94171E−01, A6 = 0.25603E−01, A8 = −0.94067E−03, A10 = −0.48672E−03, A12 = 0.72963E−04, A14 = −0.32021E−05

Surface 9

K = −0.10009E+02, A4 = −0.47981E−01, A6 = 0.11779E−01, A8 = −0.20554E−02, A10 = 0.21393E−03, A12 = −0.11453E−04, A14 = 0.23577E−06

[Overall Data]

| | |
|---|---|
| f | 4.891 |
| Fno. | 2.8 |
| ω | 35.7 |
| y'max | 3.528 |
| TL | 5.7 |
| BF | 0.5 |

-continued

Unit: mm

[Single Lens Data]

| Lens Element | Starting Surface | Focal Length |
|---|---|---|
| 1 | 1 | 3.108 |
| 2 | 4 | −5.441 |
| 3 | 6 | 3.024 |
| 4 | 8 | −2.517 |

Example 3

UNIT: MM

[Surface Data]

| Surface No. (s) | r | d | nd | νd |
|---|---|---|---|---|
| Object Plane | ∞ | ∞ | | |
| 1* | 2.215 | 0.821 | 1.5447 | 56.2 |
| 2* | −10.847 | −0.034 | | |
| 3(Aperture) | ∞ | 0.134 | | |
| 4* | −29.348 | 0.634 | 1.6320 | 23.4 |
| 5* | 4.253 | 0.860 | | |
| 6* | −5.170 | 1.106 | 1.5447 | 56.2 |
| 7* | −1.661 | 0.834 | | |
| 8* | −5.555 | 0.500 | 1.5447 | 56.2 |
| 9* | 2.605 | 0.500 | | |
| 10 | ∞ | 0.145 | 1.5163 | 64.1 |
| 11 | ∞ | | | |
| Image Plane | ∞ | | | |

[Aspherical Surface Data]

Surface 1

K = −0.58931E+00, A4 = −0.13881E−03, A6 = −0.81065E−0, A8 = 0.47499E−02, A10 = −0.49718E−02

Surface 2

K = 0.25313E+02, A4 = −0.22034E−02, A6 = 0.36315E−03, A8 = −0.18311E−01, A10 = 0.81188E−02

Surface 4

K = 0.50000E+02, A4 = 0.20583E−01, A6 = 0.57516E−02, A8 = −0.34095E−01, A10 = 0.47113E−01, A12 = −0.24155E−01

Surface 5

K = −0.15401E+02, A4 = 0.58289E−01, A6 = 0.92129E−02, A8 = −0.19936E−01, A10 = 0.22139E−01, A12 = −0.76599E−02

Surface 6

K = −0.78707E+00, A4 = −0.25824E−01, A6 = −0.24371E−01, A8 = 0.18894E−01, A10 = −0.61305E−02, A12 = 0.11944E−02

Surface 7

K = −0.53216E+01, A4 = −0.10974E+00, A6 = 0.50433E−01, A8 = −0.26168E−01, A10 = 0.83436E−02, A12 = −0.97291E−03

Surface 8

K = 0.67276E+00, A4 = −0.76533E−01, A6 = 0.23274E−01, A8 = −0.10828E−02, A10 = −0.46247E−03, A12 = 0.76207E−04, A14 = −0.35969E−05

Surface 9

K = −0.12477E+02, A4 = −0.41108E−01, A6 = 0.10324E−01, A8 = −0.17504E−02, A10 = 0.18554E−03, A12 = −0.11524E−04, A14 = 0.31297E−06

UNIT: MM-continued

[Surface Data]

[Overall Data]

| | |
|---|---|
| f | 5.093 |
| Fno. | 2.8 |
| ω | 34.7 |
| y'max | 3.528 |
| TL | 6.0 |
| BF | 0.5 |

[Single Lens Data]

| Lens Element | Starting Surface | Focal Length |
|---|---|---|
| 1 | 1 | 3.453 |
| 2 | 4 | −5.836 |
| 3 | 6 | 4.045 |
| 4 | 8 | −3.187 |

Example 4

Unit: mm

[Surface Data]

| Surface No. (s) | r | d | nd | νd |
|---|---|---|---|---|
| Object Plane | ∞ | ∞ | | |
| 1* | 1.672 | 0.747 | 1.5447 | 56.2 |
| 2* | −8.303 | −0.039 | | |
| 3(Aperture) | ∞ | 0.139 | | |
| 4* | −6.343 | 0.401 | 1.6320 | 23.4 |
| 5* | 6.928 | 0.735 | | |
| 6* | −2.575 | 1.530 | 1.5447 | 56.2 |
| 7* | −1.289 | 0.358 | | |
| 8* | −3.218 | 0.500 | 1.5447 | 56.2 |
| 9* | 2.763 | 0.685 | | |
| 10 | ∞ | 0.145 | 1.5163 | 64.1 |
| 11 | ∞ | | | |
| Image Plane | ∞ | | | |

[Aspherical Surface Data]

Surface 1

K = −0.43621E+00, A4 = 0.52489E−02, A6 = −0.26720E−01, A8 = 0.28548E−01, A10 = −0.30336E−01

Surface 2

K = −0.50000E+02, A4 = 0.24124E−01, A6 = −0.37816E−01, A8 = −0.23718E−01, A10 = 0.12532E−01

Surface 4

K = −0.50000E+02, A4 = 0.11320E+00, A6 = −0.45423E−01, A8 = −0.24450E−01, A10 = 0.61165E−01, A12 = −0.17268E−01

Surface 5

K = −0.25694E+02, A4 = 0.13699E+00, A6 = −0.18304E−01, A8 = 0.11632E−01, A10 = 0.12867E−01, A12 = 0.23910E−01

Surface 6

K = 0.16704E+01, A4 = −0.39931E−01, A6 = −0.53281E−01, A8 = 0.56912E−01, A10 = −0.53272E−01, A12 = 0.10669E−01

Surface 7

K = −0.39432E+01, A4 = −0.11130E+00, A6 = 0.58456E−01, A8 = −0.29063E−01, A10 = 0.94954E−02, A12 = −0.11296E−02

Surface 8

K = −0.14244E+01, A4 = −0.63293E−01, A6 = 0.21853E−01, A8 = −0.80112E−03, A10 = −0.46267E−03, A12 = 0.68720E−04, A14 = −0.29564E−05

-continued

| Unit: mm |
|---|
| Surface 9 |
| K = −0.22197E+02, A4 = −0.54411E−01, A6 = 0.13155E−01, A8 = −0.23016E−02, A10 = 0.22512E−03, A12 = −0.10325E−04, A14 = 0.18137E−06 |

| [Overall Data] | |
|---|---|
| f | 5.086 |
| Fno. | 2.8 |
| ω | 34.7 |
| y'max | 3.528 |
| TL | 5.7 |
| BF | 0.5 |

[Single Lens Data]

| Lens Element | Starting Surface | Focal Length |
|---|---|---|
| 1 | 1 | 2.624 |
| 2 | 4 | −5.179 |
| 3 | 6 | 3.340 |
| 4 | 8 | −2.651 |

Example 5

Unit: mm

[Surface Data]

| Surface No. (s) | r | d | nd | νd |
|---|---|---|---|---|
| Object Plane | ∞ | ∞ | | |
| 1* | 1.378 | 0.571 | 1.5447 | 56.2 |
| 2* | −6.370 | 0.000 | | |
| 3(Aperture) | ∞ | 0.050 | | |
| 4* | −50.422 | 0.330 | 1.6320 | 23.4 |
| 5* | 2.523 | 0.445 | | |
| 6* | −2.536 | 0.893 | 1.5447 | 56.2 |
| 7* | −0.704 | 0.126 | | |
| 8* | −2.649 | 0.450 | 1.5447 | 56.2 |
| 9* | 1.161 | 0.490 | | |
| 10 | ∞ | 0.145 | 1.5163 | 64.1 |
| 11 | ∞ | | | |
| Image Plane | ∞ | | | |

[Aspherical Surface Data]

Surface 1

K = −0.56202E+00, A4 = −0.52445E−02, A6 = −0.70419E−01, A8 = 0.10623E+00, A10 = −0.29497E+00

Surface 2

K = 0.75595E+01, A4 = 0.27740E−01, A6 = −0.35539E−01, A8 = −0.74147E+00, A10 = 0.95343E+00

Surface 4

K = 0.50000E+02, A4 = 0.17120E+00, A6 = −0.65756E−01, A8 = −0.54460E+00, A10 = 0.10906E+01, A12 = −0.63113E+00

Surface 5

K = 0.40363E+01, A4 = 0.16733E+00, A6 = 0.12182E+00, A8 = −0.48870E+00, A10 = 0.15244E+01, A12 = −0.15559E+01

Surface 6

K = −0.20214E+00, A4 = −0.95330E−01, A6 = −0.13320E+00, A8 = 0.44773E+00, A10 = −0.65022E+00, A12 = 0.55041E+00

Surface 7

K = −0.37041E+01, A4 = −0.36731E+00, A6 = 0.42581E+00, A8 = −0.49610E+00, A10 = 0.37150E+00, A12 = −0.11363E+00

-continued

Unit: mm

Surface 8

K = −0.38577E+02, A4 = −0.23817E+00, A6 = 0.14388E+00, A8 = −0.18988E−01, A10 = −0.18428E−01, A12 = 0.83604E−02, A14 = −0.11331E−02

Surface 9

K = −0.11076E+02, A4 = −0.13205E+00, A6 = 0.73334E−01, A8 = −0.32747E−01, A10 = 0.87685E−02, A12 = −0.13833E−02, A14 = 0.99176E−04

| [Overall Data] | |
|---|---|
| f | 3.294 |
| Fno. | 2.8 |
| ω | 34.4 |
| y'max | 2.268 |
| TL | 4.0 |
| BF | 0.5 |

[Single Lens Data]

| Lens Element | Starting Surface | Focal Length |
|---|---|---|
| 1 | 1 | 2.135 |
| 2 | 4 | −3.793 |
| 3 | 6 | 1.527 |
| 4 | 8 | −1.422 |

Table 1 shows the values corresponding to Formulae (1) to (7) as actually observed in each example.

TABLE 1

| | Example 1 | Example 2 | Example 3 | Example 4 | Example 5 |
|---|---|---|---|---|---|
| (1) f3/f | 0.714 | 0.618 | 0.794 | 0.657 | 0.463 |
| (2) SIL/TL | 0.874 | 0.887 | 0.869 | 0.876 | 0.857 |
| (3) r1/f | 0.372 | 0.400 | 0.435 | 0.329 | 0.418 |
| (4) ν2 | 23.4 | 23.4 | 23.4 | 23.4 | 23.4 |
| (5) T3/f | 0.238 | 0.256 | 0.217 | 0.301 | 0.271 |
| (6) T4/f | 0.102 | 0.102 | 0.098 | 0.098 | 0.137 |
| (7) T4/SG4 | 0.41 | 0.42 | 0.39 | 0.47 | 0.47 |

FIGS. 9 to 13 are aberration diagrams of Examples 1 to 5 respectively. Each figure contains, from left to right, diagrams showing spherical aberration, astigmatism, and distortion as observed with the focus at infinity. In the spherical aberration diagram, line d represents the spherical aberration for d-line (with a wavelength of 587.56 nm), and line g represents the spherical aberration for g-line (with a wavelength of 435.84). In the astigmatism diagram, lines S and M represent the astigmatism on the sagittal and meridional surfaces respectively. In the spherical aberration and astigmatism diagrams, the horizontal axis is in mm; in the distortion diagram, the horizontal axis is in percent (%).

In Examples 1 to 5, as shown in FIGS. 9 to 13, aberrations are satisfactorily corrected.

INDUSTRIAL APPLICABILITY

The present invention finds applications in image-taking lens systems for directing light to an image-sensing element, image-taking devices provided with an image-taking lens system, and portable terminals provided with an image-taking device.

LIST OF REFERENCE SIGNS

10 image-taking lens system
20 lens barrel

50 image-taking device
51 image sensor (image-sensing element)
52 board
100 cellular phone (portable terminal)
F filter
I image plane
L1-L4 lenses
s1, 2, s4-s9 lens surfaces
s3 aperture stop
s10, s11 filter surfaces

The invention claimed is:

1. An image-taking lens system for imaging light from a subject on an image-sensing element, comprising, from an object side:

a first lens element having a positive refractive power;
an aperture stop;
a second lens element having a negative refractive power and having a concave surface facing an image side;
a third lens element having a positive refractive power; and
a fourth lens element having a negative refractive power and having a concave surface facing the image side,
wherein the following formulae are fulfilled:

$$0.45<f3/f<0.95 \quad (1)$$

$$0.75<SIL/TL<0.95 \quad (2)$$

$$0.3<r1/f<0.45 \quad (3)$$

where f3 represents a focal length of the third lens element; f represents a focal length of the entire image-taking lens system; SIL represents a distance from an aperture stop plane to an image plane along an optical axis; TL represents a distance from a most object-side lens surface of the image-taking lens system to the image plane along the optical axis; and r1 represents a radius of curvature of an object-side lens surface of the first lens element L1.

2. The image-taking lens system according to claim 1, wherein the second lens element fulfills the following formula:

$$15<v2<31 \quad (4)$$

wherein, v2 represents an Abbe number of the second lens element L2.

3. The image-taking lens system according to claim 1, wherein the third lens element fulfills the following formula:

$$0.2<T3/f<0.34 \quad (5)$$

wherein, T3 represents a thickness of the third lens element L3 along the optical axis, and f represents the focal length of the entire image-taking lens system.

4. The image-taking lens system according to claim 1, wherein the fourth lens element fulfills the following formula:

$$0.05<T4/f<0.17 \quad (6)$$

wherein, T4 represents a thickness of the fourth lens element L4 along the optical axis, and f represents the focal length of the entire image-taking lens system.

5. The image-taking lens system according to claim 1, wherein the fourth lens element fulfills the following formula:

$$0.3<T4/SG4<0.6 \quad (7)$$

wherein, T4 represents a thickness of the fourth lens element L4 along the optical axis, and SG4 represents a thickness of the fourth lens element L4 at a thickest part thereof.

6. The image-taking lens system according to claim 1, wherein the fourth lens element is a biconcave lens element.

7. The image-taking lens system according to claim 1, wherein an image-side lens surface of the fourth lens element has an aspherical shape, and
the aspherical surface has a negative refractive power near the optical axis, has an increasingly low negative refractive power toward a peripheral part of the lens surface, and has an inflection point in the peripheral part of the lens surface.

8. The image-taking lens system according to claim 1, wherein the first to fourth lens elements are formed of a resin material.

9. An image-taking device comprising:

the image-taking lens system according to claim 1; and
an image-sensing element.

10. A portable terminal comprising the image-taking device according to claim 9.

* * * * *